US011631312B2

(12) United States Patent
Roselle et al.

(10) Patent No.: US 11,631,312 B2
(45) Date of Patent: Apr. 18, 2023

(54) METHODS, SYSTEMS, APPARATUSES, AND DEVICES FOR PROVIDING PROTECTION TO USERS WORKING IN THE FIELD

(71) Applicants: Holly Sisk Roselle, Brentwood, TN (US); Charles Michael Roselle, Brentwood, TN (US)

(72) Inventors: Holly Sisk Roselle, Brentwood, TN (US); Charles Michael Roselle, Brentwood, TN (US)

(*) Notice: Subject to any disclaimer, the term of this patent is extended or adjusted under 35 U.S.C. 154(b) by 50 days.

(21) Appl. No.: 17/482,335

(22) Filed: Sep. 22, 2021

(65) Prior Publication Data
US 2022/0092956 A1 Mar. 24, 2022

Related U.S. Application Data

(60) Provisional application No. 63/081,779, filed on Sep. 22, 2020.

(51) Int. Cl.
*G08B 21/02* (2006.01)
*G06Q 10/1091* (2023.01)
*G08B 25/10* (2006.01)
*G06Q 50/26* (2012.01)
*G06N 20/00* (2019.01)

(52) U.S. Cl.
CPC ......... *G08B 21/02* (2013.01); *G06Q 10/1091* (2013.01); *G06Q 50/265* (2013.01); *G08B 25/10* (2013.01); *G06N 20/00* (2019.01)

(58) Field of Classification Search
CPC ........ G08B 21/02; G08B 25/10; G08B 27/00; G06Q 10/1091; G06Q 50/265; G06N 20/00
See application file for complete search history.

(56) References Cited

U.S. PATENT DOCUMENTS

| | | | |
|---|---|---|---|
| 2013/0290154 A1* | 10/2013 | Cherry | G06Q 10/1091 705/32 |
| 2014/0114824 A1* | 4/2014 | Kong | G06Q 10/1091 705/32 |
| 2015/0278537 A1* | 10/2015 | Lyall | G07F 19/211 726/17 |
| 2015/0302362 A1* | 10/2015 | Cherry | G06Q 10/1091 705/32 |
| 2015/0310566 A1* | 10/2015 | Smyth | G06Q 40/125 705/32 |
| 2017/0069036 A1* | 3/2017 | Shaaban | G06Q 10/1091 |
| 2019/0172567 A1* | 6/2019 | Aycock | G06N 7/005 |
| 2020/0042936 A1* | 2/2020 | Jain | G06F 40/14 |
| 2020/0042950 A1* | 2/2020 | Gulden | H04W 4/029 |
| 2020/0293996 A1* | 9/2020 | Wu | H04L 9/3213 |

* cited by examiner

*Primary Examiner* — Ojiako K Nwugo

(57) ABSTRACT

A method and system for providing protection to users working in a field are provided. Further, the method may include steps of receiving user data associated with the users from user devices, receiving sensor data associated with the users from sensors comprised in the user devices, analyzing the user data and the sensor data, determining a condition of the users based on the analyzing, comparing the condition with alert triggering conditions based on the determining of the condition, generating alert notifications for the users based on the comparing of the condition with the alert triggering conditions, transmitting the alert notifications to emergency contact devices associated with emergency contacts of the users, and storing the user data, the sensor data, the condition, and the alert notifications.

20 Claims, 31 Drawing Sheets

METHODS, SYSTEMS, APPARATUSES, AND DEVICES FOR PROVIDING PROTECTION TO USERS WORKING IN THE FIELD

The current application claims a priority to the U.S. provisional patent application Ser. No. 63/081,779 filed on Sep. 22, 2020.

FIELD OF THE INVENTION

Generally, the present disclosure relates to the field of data processing. More specifically, the present disclosure relates to methods, systems, apparatuses, and devices for providing protection to users working in a field.

BACKGROUND OF THE INVENTION

Existing techniques for providing protection to users working in the field are deficient with regard to several aspects. For instance, current technologies require users to call, text, cry out, be heard, or do anything to notify their emergency contacts that they are in distress.

Therefore, there is a need for methods, systems, apparatuses, and devices for providing protection to users working in the field that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a method for providing protection to users working in a field, in accordance with some embodiments. The method may include a step of receiving, using a communication device, one or more user data associated with one or more users from one or more user devices. Further, the one or more user data may include one or more of a check-in time for entering and a check-out time for exiting one or more expected locations of the field. Further, the method may include a step of receiving, using the communication device, one or more sensor data associated with the one or more users from one or more sensors included in the one or more user devices. Further, the one or more sensors may include one or more location sensors. Further, the one or more location sensors may be configured for generating one or more location data based on a current location of the one or more users at a current time. Further, the one or more sensor data may include the one or more location data. Further, the method may include a step of analyzing, using a processing device, the one or more user data and the one or more sensor data. Further, the analyzing may include comparing the current location at the current time with the one or more expected locations at one or more of the check-in time and the check-out time. Further, the method may include a step of determining, using the processing device, a condition of the one or more users based on the analyzing. Further, the method may include a step of comparing, using the processing device, the condition with one or more alert triggering conditions based on the determining of the condition. Further, the method may include a step of generating, using the processing device, one or more alert notifications for the one or more users based on the comparing of the condition with the one or more alert triggering conditions. Further, the method may include a step of transmitting, using the communication device, the one or more alert notifications to one or more emergency contact devices associated with one or more emergency contacts of the one or more users. Further, the method may include a step of storing, using a storage device, one or more of the one or more user data, the one or more sensor data, the condition, and the one or more alert notifications.

Further disclosed herein is a system for providing protection to users working in a field, in accordance with some embodiments. The system may include a communication device, a processing device, and a storage device. Further, the communication device may be configured for performing a step of receiving one or more user data associated with one or more users from one or more user devices. Further, the one or more user data may include one or more of a check-in time for entering and a check-out time for exiting one or more expected locations of the field. Further, the communication device may be configured for performing a step of receiving one or more sensor data associated with the one or more users from one or more sensors included in the one or more user devices. Further, the one or more sensors may include one or more location sensors. Further, the one or more location sensors may be configured for generating one or more location data based on a current location of the one or more users at a current time. Further, the one or more sensor data may include the one or more location data. Further, the communication device may be configured for performing a step of transmitting one or more alert notifications to one or more emergency contact devices associated with one or more emergency contacts of the one or more users. The processing device may be communicatively coupled with the communication device. Further, the processing device may be configured for performing a step of analyzing the one or more user data and the one or more sensor data. Further, the analyzing may include comparing the current location at the current time with the one or more expected locations at one or more of the check-in time and the check-out time. Further, the processing device may be configured for performing a step of determining a condition of the one or more users based on the analyzing. Further, the processing device may be configured for performing a step of comparing the condition with one or more alert triggering conditions based on the determining of the condition. Further, the processing device may be configured for performing a step of generating the one or more alert notifications for the one or more users based on the comparing of the condition with the one or more alert triggering conditions. The storage device may be communicatively coupled with the processing device. Further, the storage device may be configured for performing a step of storing one or more of the one or more user data, the one or more sensor data, the condition, and the one or more alert notifications.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION OF THE INVENTION

Figure 1:
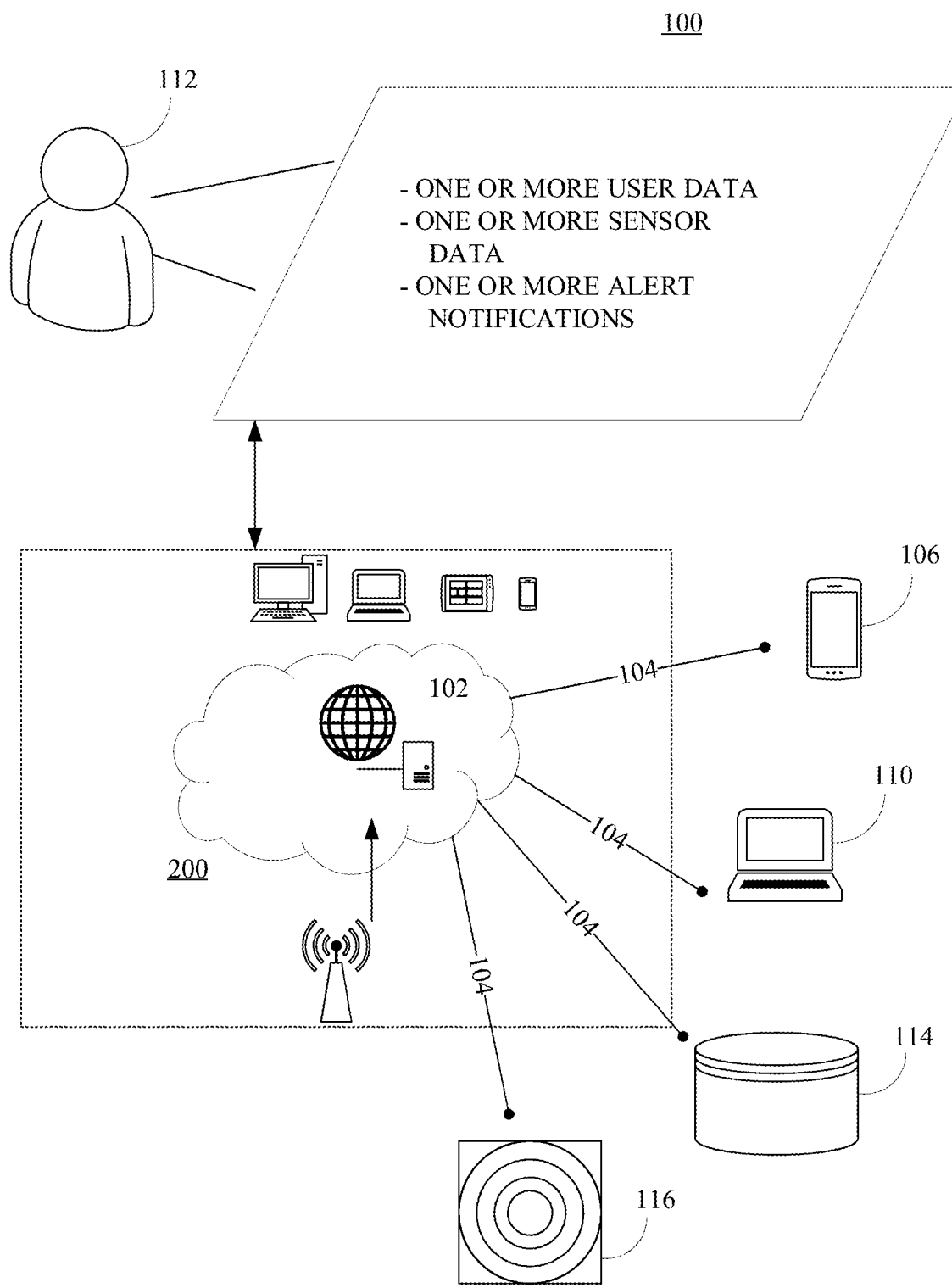
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of providing protection to users working in a field, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor, and at least one actuator. Examples of the one or more client devices and/or the server computer may include, a desktop computer, a laptop computer, a tablet computer, a personal digital assistant, a portable electronic device, a wearable computer, a smartphone, an Internet of Things (IoT) device, a smart electrical appliance, a video game console, a rack server, a super-computer, a mainframe computer, mini-computer, micro-computer, a storage server, an application server (e.g., a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g., Windows, Mac OS, Unix, Linux, Android, etc.) in order to provide a user interface (e.g., GUI, touch-screen based interface, voice based interface, gesture based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, a public database, a private database, and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled, and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal, or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g., username, password, passphrase, PIN, secret question, secret answer, etc.) and/or possession of a machine readable secret data (e.g., encryption key, decryption key, bar codes, etc.) and/or or possession of one or more embodied characteristics unique to the user (e.g., biometric variables such as, but not limited to, fingerprint, palm-print, voice characteristics, behavioral characteristics, facial features, iris pattern, heart rate variability, evoked potentials, brain waves, and so on) and/or possession of a unique device (e.g., a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g., transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera, and so on. Likewise, the one or more steps may include receiving, using the communication device, the one or more embodied characteristics from one or more biometric sensors.

Further, one or more steps of the method may be automatically initiated, maintained, and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g., the server computer, a client device, etc.) corresponding to the performance of the one or more steps, environmental variables (e.g., temperature, humidity, pressure, wind speed, lighting, sound, etc.) associated with a device corresponding to the performance of the one or more steps, physical state and/or physiological state and/or psychological state of the user, physical state (e.g., motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g., a real-time clock), a location sensor (e.g., a GPS receiver, a GLONASS receiver, an indoor location sensor, etc.), a biometric sensor (e.g., a fingerprint sensor), an environmental variable sensor (e.g., temperature sensor, humidity sensor, pressure sensor, etc.) and a device state sensor (e.g., a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g., initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data, and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview

The present disclosure describes methods, systems, apparatuses, and devices for providing protection to users working in a field.

Further, the present disclosure describes a Forcefield Security application (app). The Forcefield Security app helps to keep workers in the field safe (Ex: Home Health Care Nurses, Social Workers, Real Estate Agents, Technicians, etc.). Working in the field and entering homes, away from a central office, can provide unique security risks. If the risks are not addressed, it can result in more harm to employees. The utility of the Forcefield Security app is to provide a unique security line of protection for workers alone in the field. The distinctive CHECK IN/CHECK OUT feature allows the USER to cry for help even if they can't. The app is designed for both the iOS and Android platforms and the administrative company panel will run on the Amazon Website Services platform. The active functions of the Forcefield App consist of USER: geolocation, check-in/ check-out, an alarm, an SOS button, and a Field Log. The app "communicates" this information to a web interface company panel that includes a full scope of the USER: location in the field (geolocation, interactive map), check-in times, check-out times, any missed check-out times, any SOS alerts, and a field log. All these capabilities create a more secure and safe work environment for the worker in the field.

Figure 18:
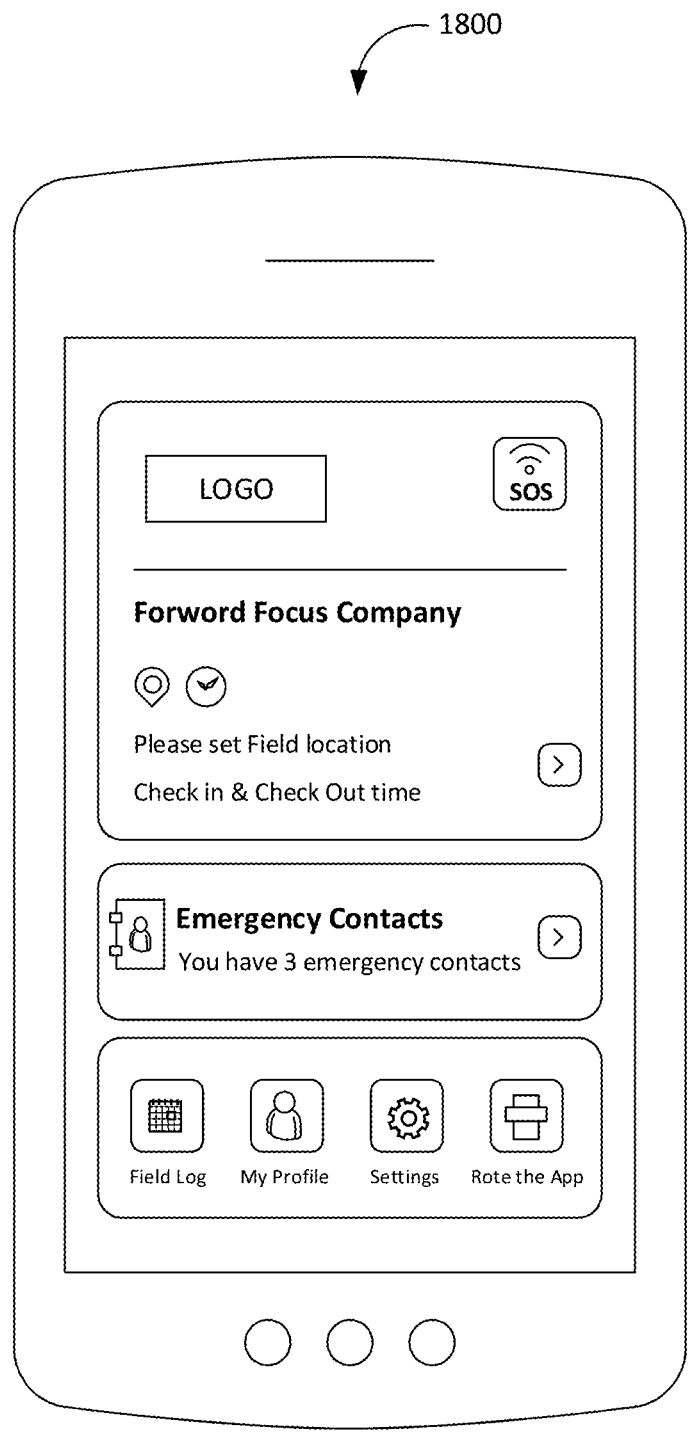
FIG. 18 illustrates a user interface of an application for providing protection to users working in a field, in accordance with some embodiments.
Figure 26:
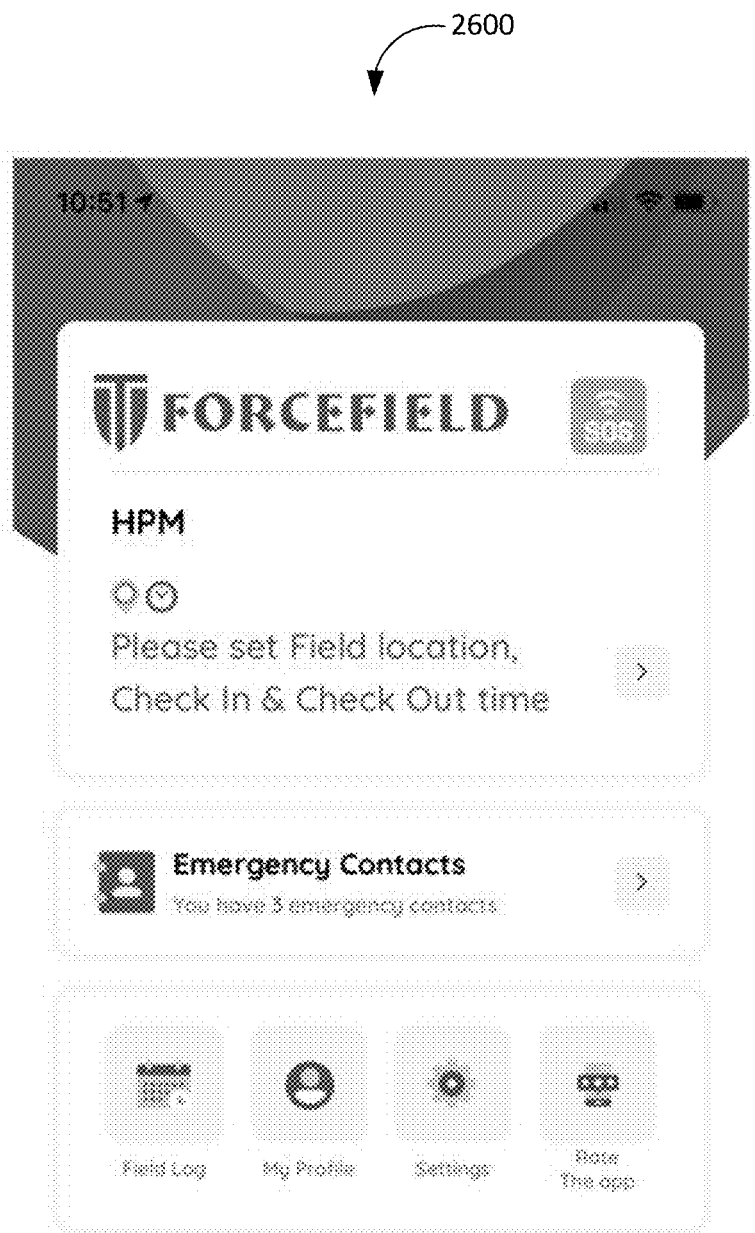
FIG. 26 illustrates a user interface of an application for providing protection to users working in a field, in accordance with some embodiments.

A first capability of Forcefield Security app is the Check-In/Check-Out feature, which allows the worker (USER) to provide a "Check-In" and "Check Out" time of their current task. The Home Screen (as shown in FIG. 18 and FIG. 26) is what will first appear to the USER to enter a Check-In/ Check-Out Time and Field Location.

Figure 19:
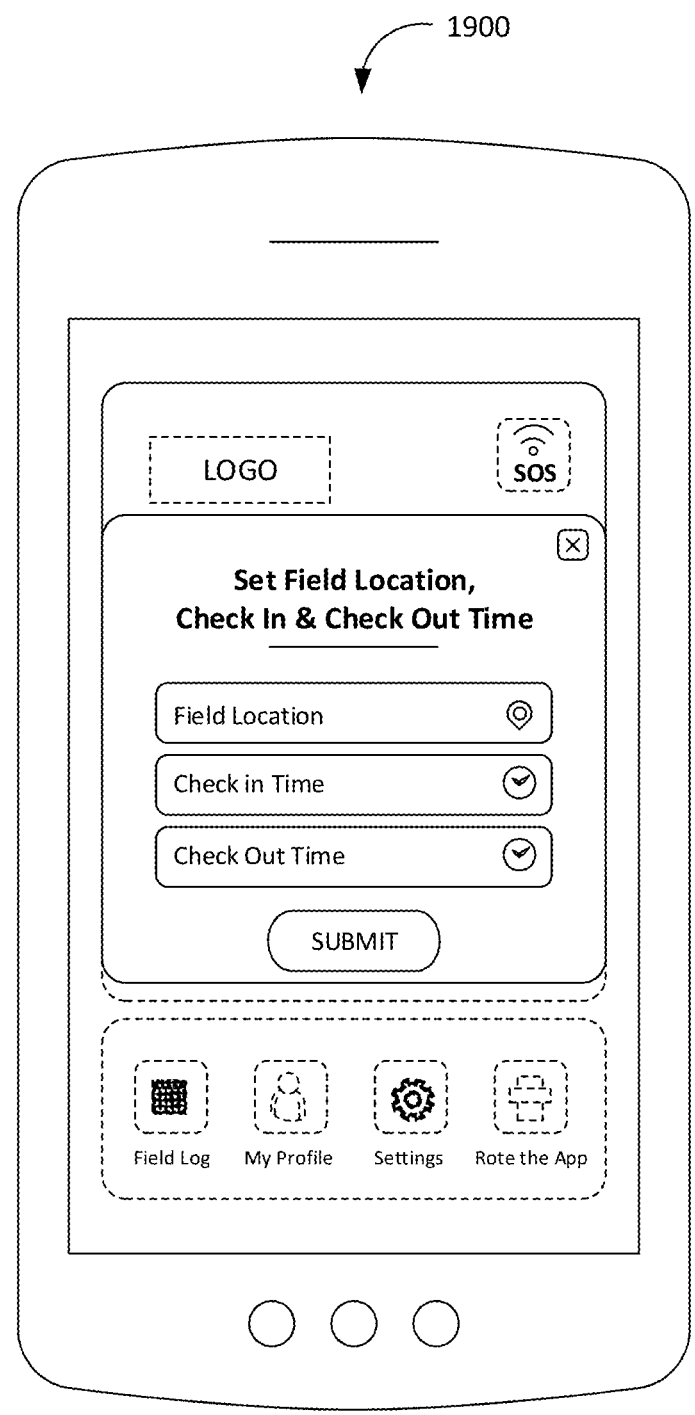
FIG. 19 illustrates a user interface of the application, in accordance with some embodiments.
Figure 27:
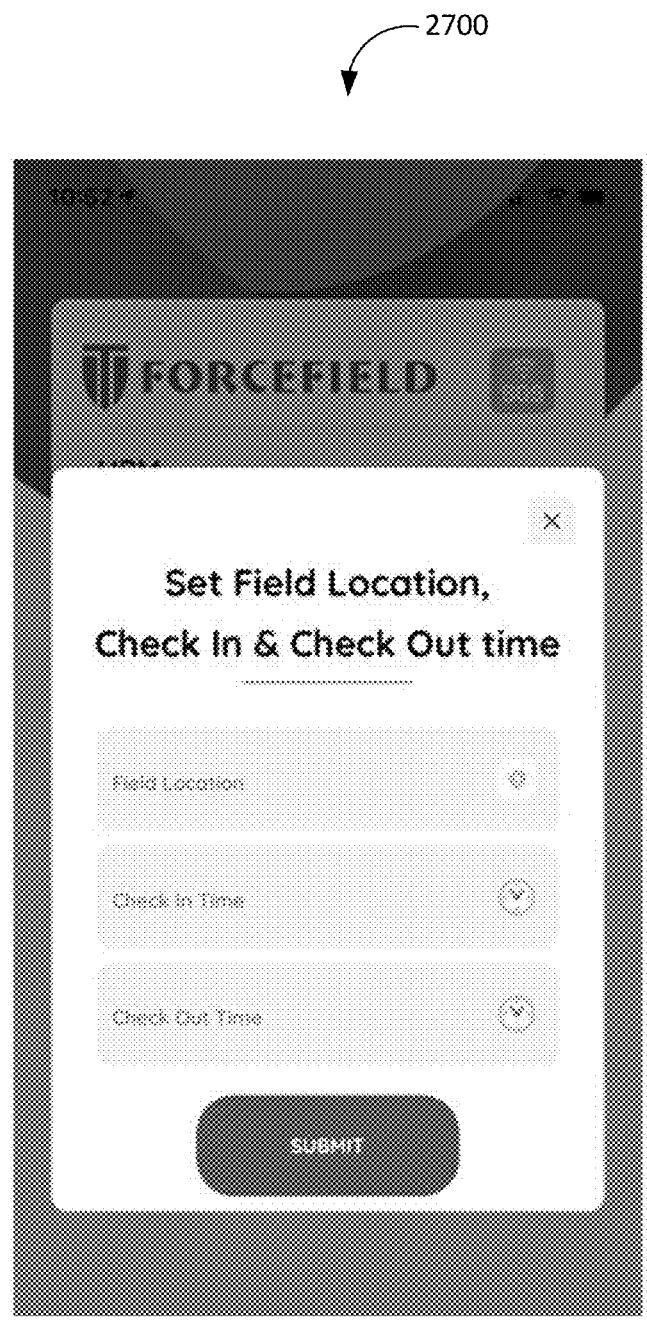
FIG. 27 illustrates a user interface of the application, in accordance with some embodiments.

Before the worker physically enters their field location, they will enter both their field location address, which is also automatically geolocated and their Check-In/Check-Out times. (as shown in FIG. 19 and FIG. 27).

Figure 20:
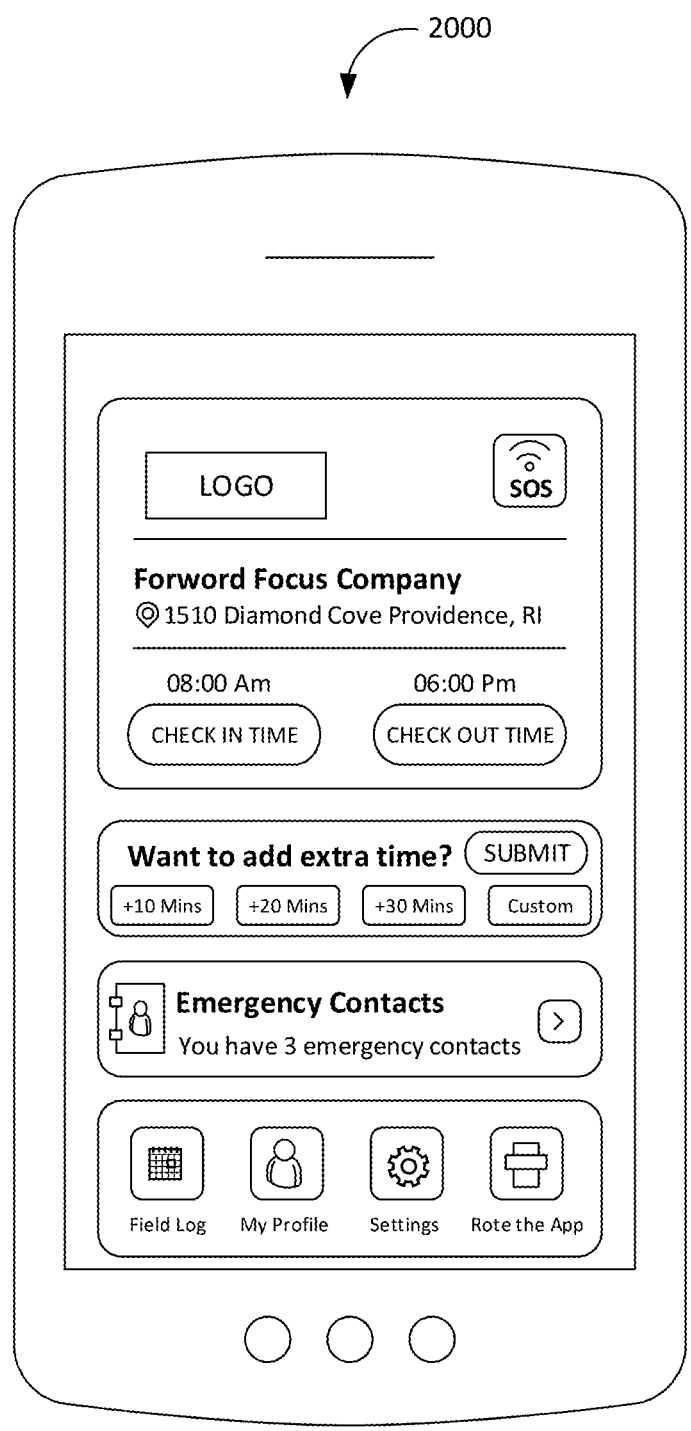
FIG. 20 illustrates a user interface of the application, in accordance with some embodiments.
Figure 28:
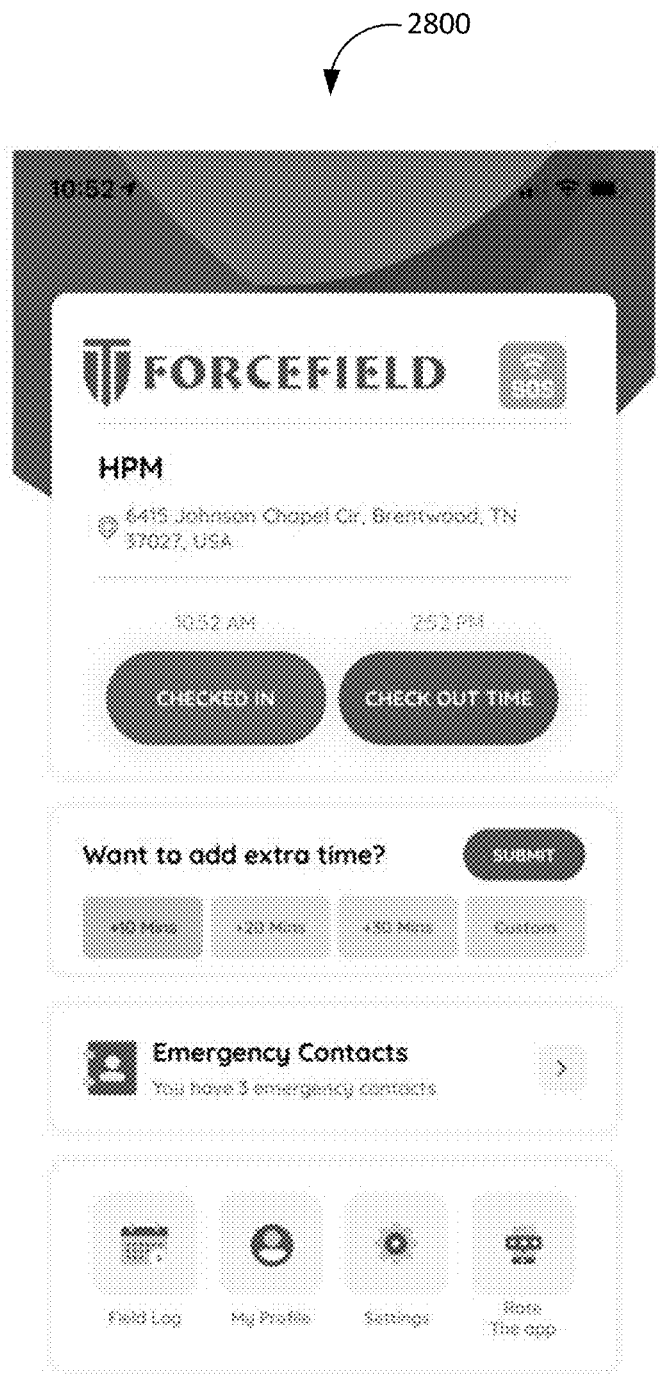
FIG. 28 illustrates a user interface of the application, in accordance with some embodiments.

After the USER has submitted a Check-In/Check-Out time, which is done from a drop-down option of full 24-hour range, they will be fully checked In (as shown in FIG. 20 and FIG. 28).

When the USER checks out, the task will be closed and programmed into the Field Log (#4.) At that time, the USER may immediately start the same process for a new task. If the worker does not check out in time, their pre-programmed emergency contacts will get the following text notification: (Profile name) has not checked out of a task on time at (location). Please contact (Profile name). This function allows the USER to be contacted by the emergency contacts that received this message to help assure their safety. If the USER does not answer, their emergency contacts know that they are possibly in distress, and they know where to find them to get them the help they need. The critical value of this feature is that it allows the worker to call for help even if they cannot call for help in any way. The USER does not need to call, text, cry out, touch anything, be heard, or do anything to notify their emergency contacts that they are in distress, it will automatically do that for them if they do not check out in time. The first 48 hours after a crime takes place is critical to increasing the chances of helping a victim. This feature can help the USER's emergency contacts provide security and law enforcement notification of distress quicker, which can help increase the chances of victim safety.

Figure 21:
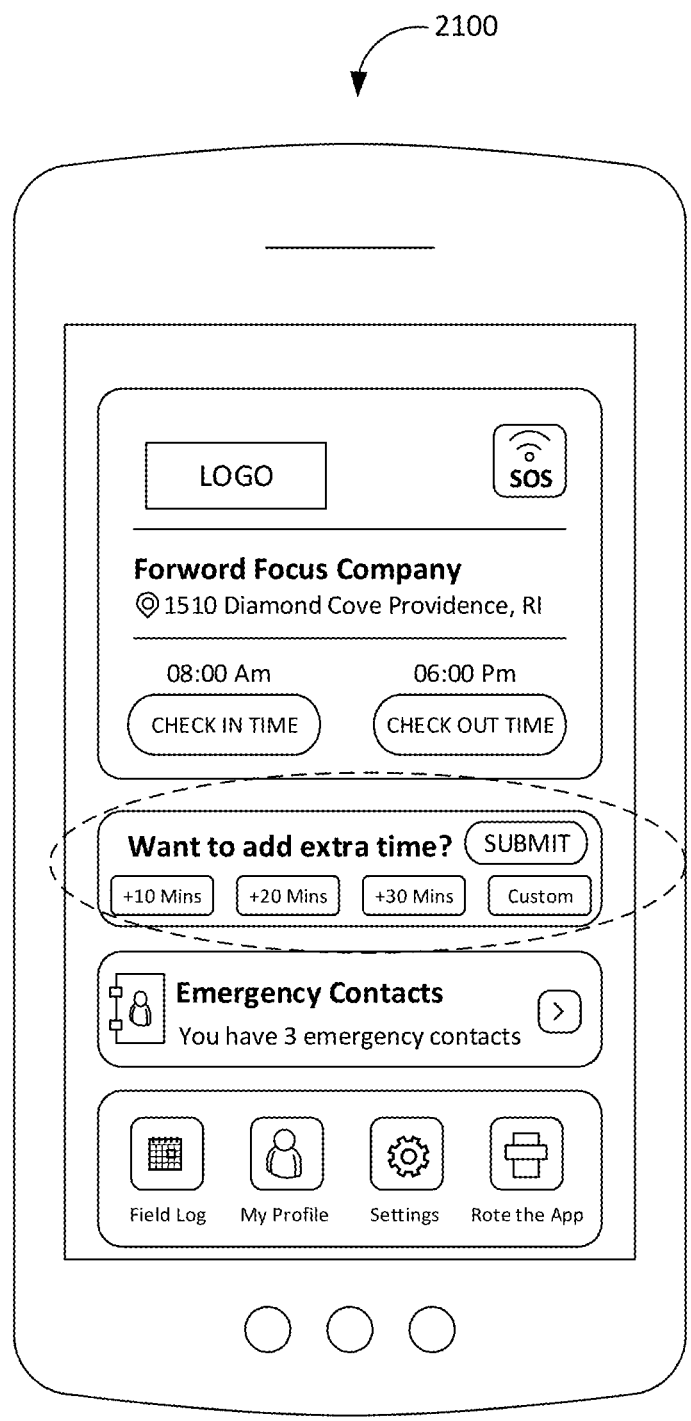
FIG. 21 illustrates a user interface of the application, in accordance with some embodiments.
Figure 29:
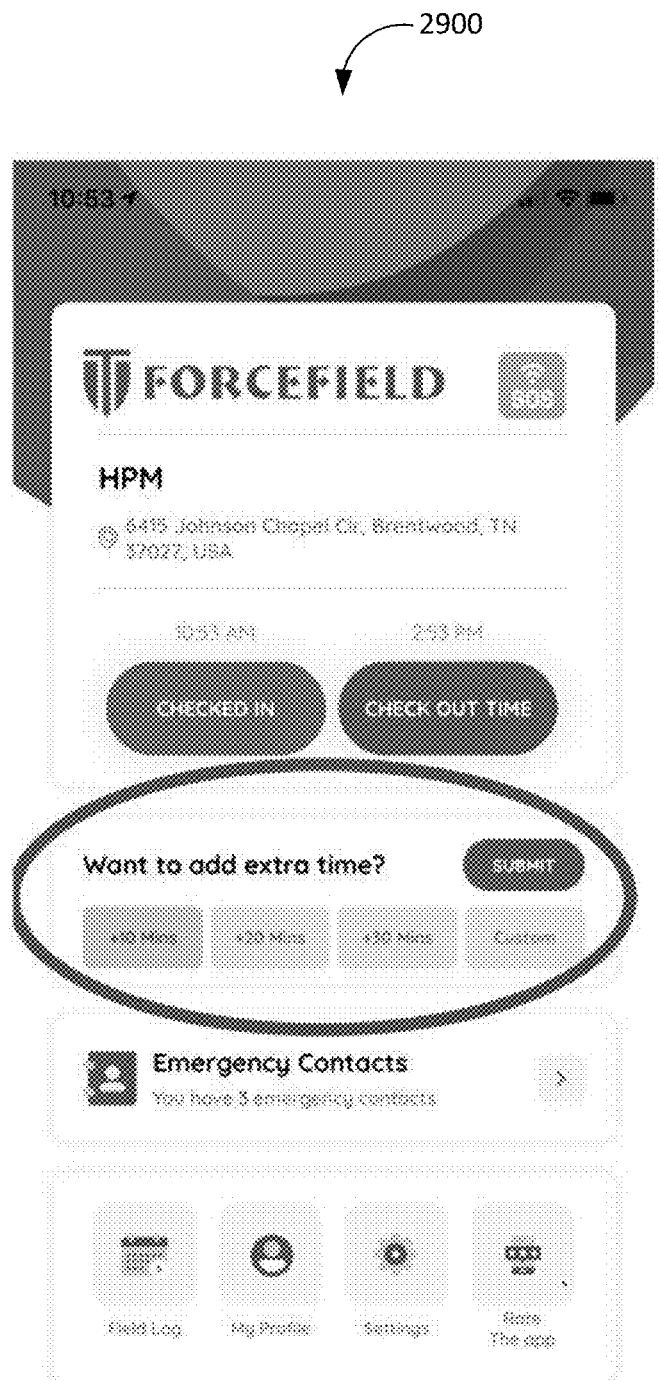
FIG. 29 illustrates a user interface of the application, in accordance with some embodiments.

A second capability of Forcefield Security app is the Alarm (as shown in FIG. 21 and FIG. 29), which helps prohibit false alarms of distress to the USER's emergency contacts. The alarm will go off 10 minutes prior to the USER's check-out time. If the USER needs more time, they simply push the appropriate "add time" key. The USER can continue to do this until they are done.

Figure 22:
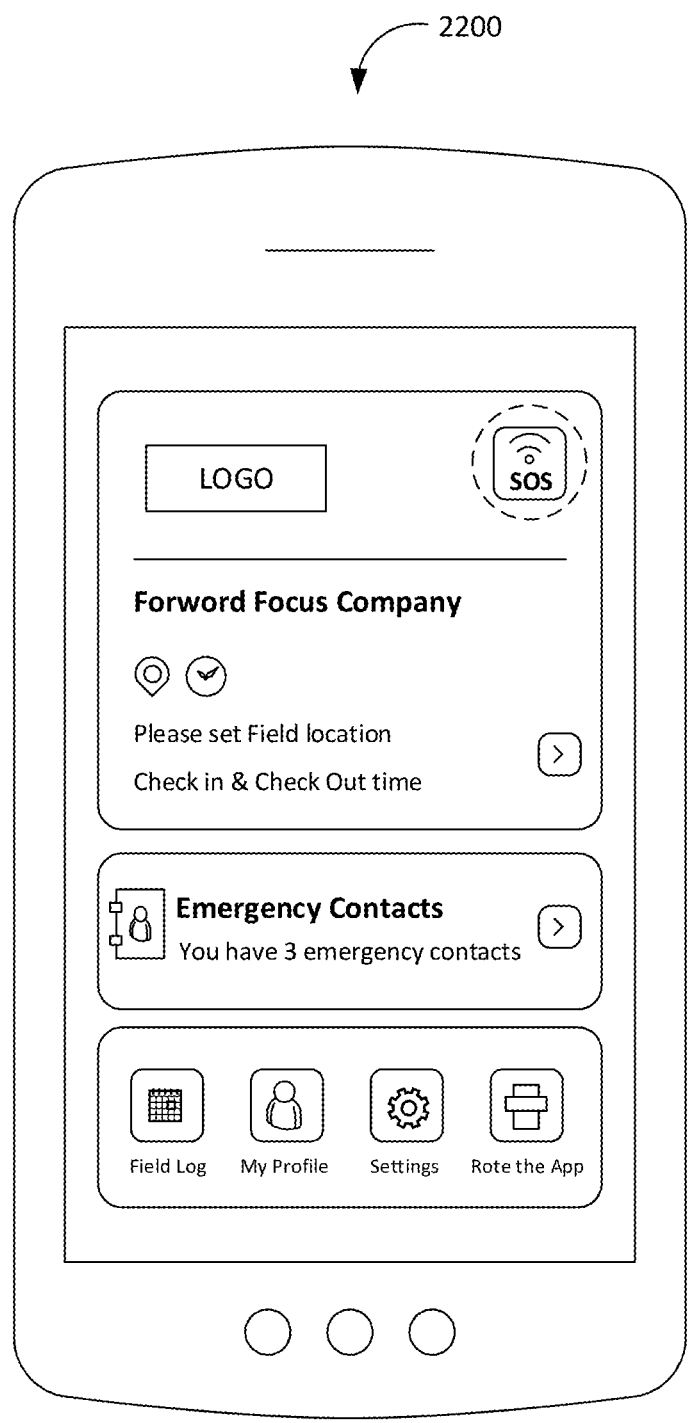
FIG. 22 illustrates a user interface of the application, in accordance with some embodiments.
Figure 30:
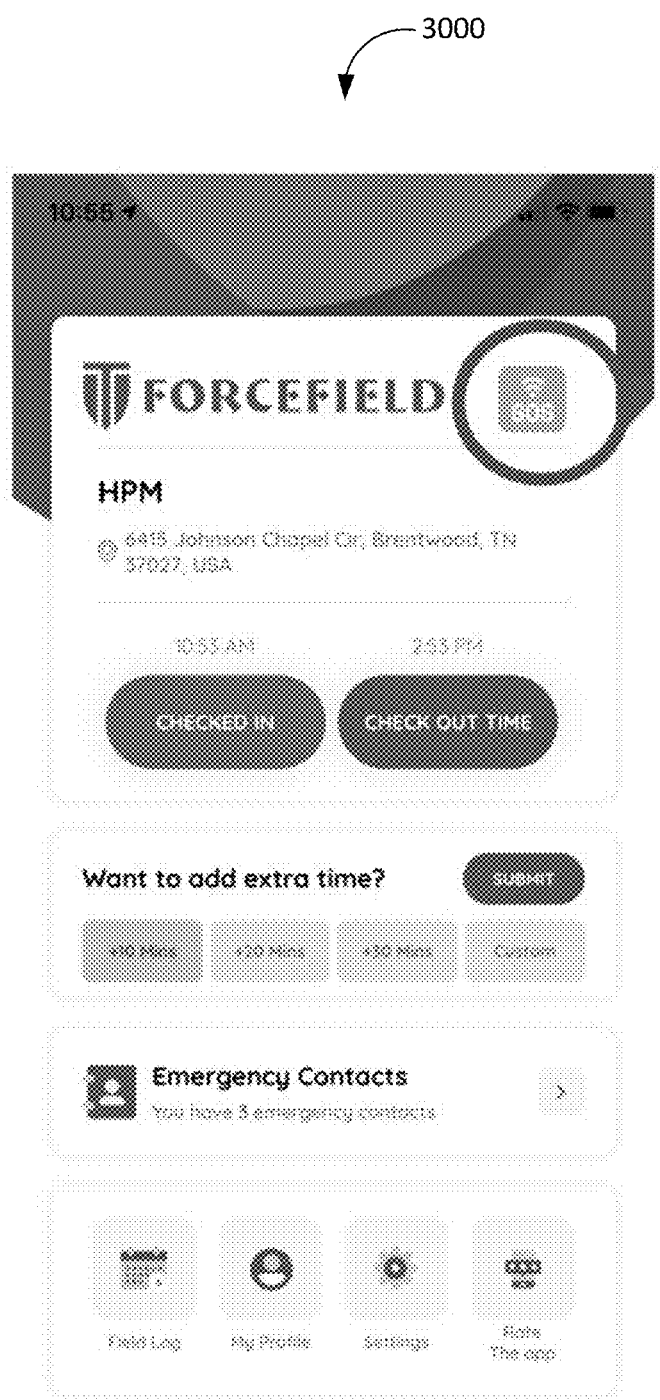
FIG. 30 illustrates a user interface of the application, in accordance with some embodiments.

A third capability of Forcefield Security app is the SOS button (as shown in FIG. 22 and FIG. 30), which provides the USER the capability to notify their emergency contacts if they are in distress and need help. If the USER pushes the SOS key, their emergency contacts will receive the following text: PROFILE NAME has made an emergency SOS notification from (location). Please contact PROFILE NAME. Similar to a missed check out, this feature helps the USER's emergency contacts provide law enforcement with important information which can help increase the chances of victim safety.

Figure 23:
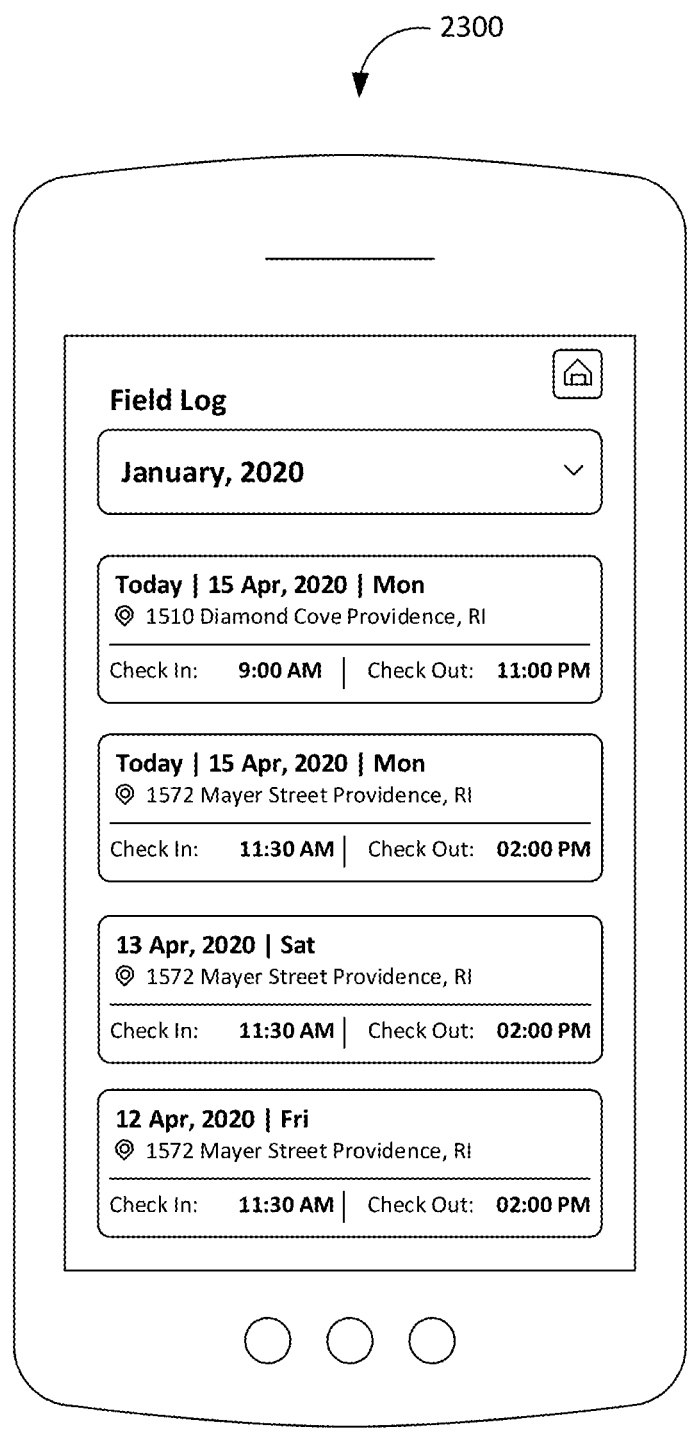
FIG. 23 illustrates a user interface of the application, in accordance with some embodiments.
Figure 31:
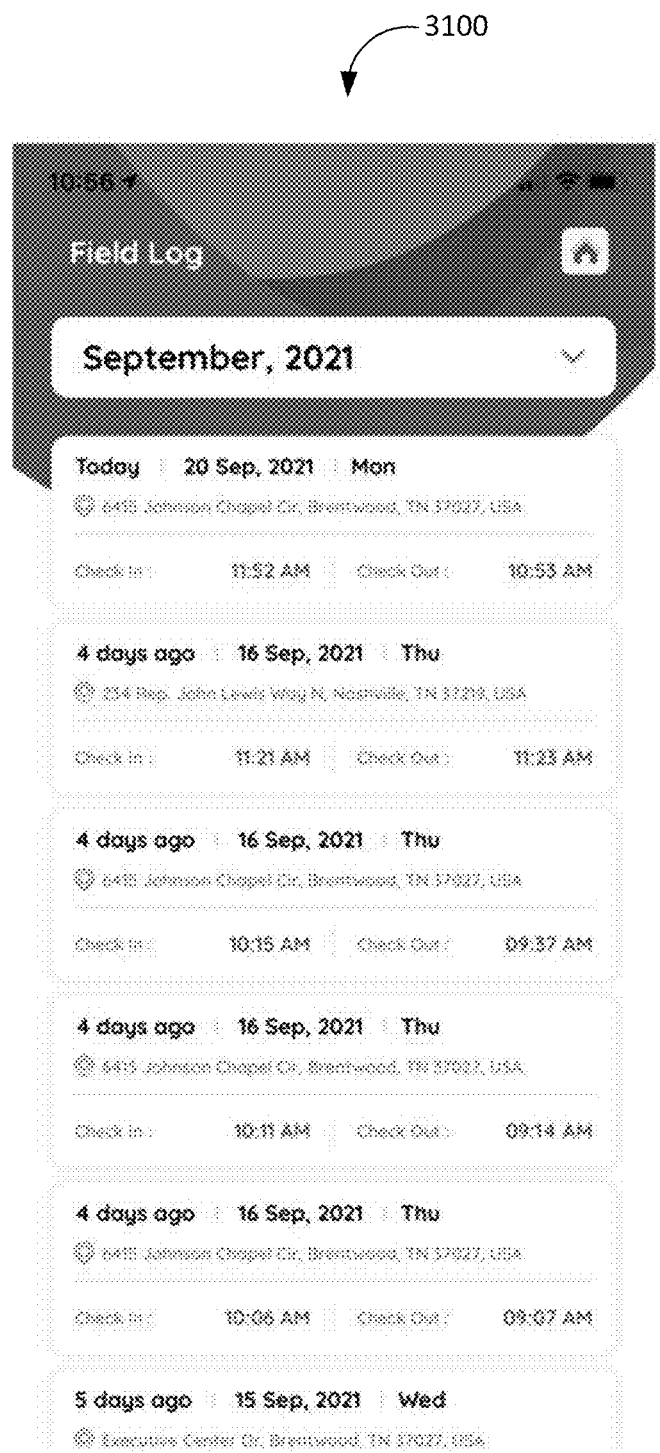
FIG. 31 illustrates a user interface of the application, in accordance with some embodiments.

A fourth capability of Forcefield Security app is the Field Log (as shown in FIG. 23 and FIG. 31), which allows the USER to view all the previous locations and check-in/check-out times of the USER for the duration of approximately 4 weeks at a time. After each "Check Out", the task will immediately be logged into the Field Log. As mentioned, the first 48 hours after a crime takes place is critical to increasing the chances of helping a victim. This field log, which is communicated to the company panel, gives security officials important information to help in any investigations done to help a victim of crime.

Figure 24:
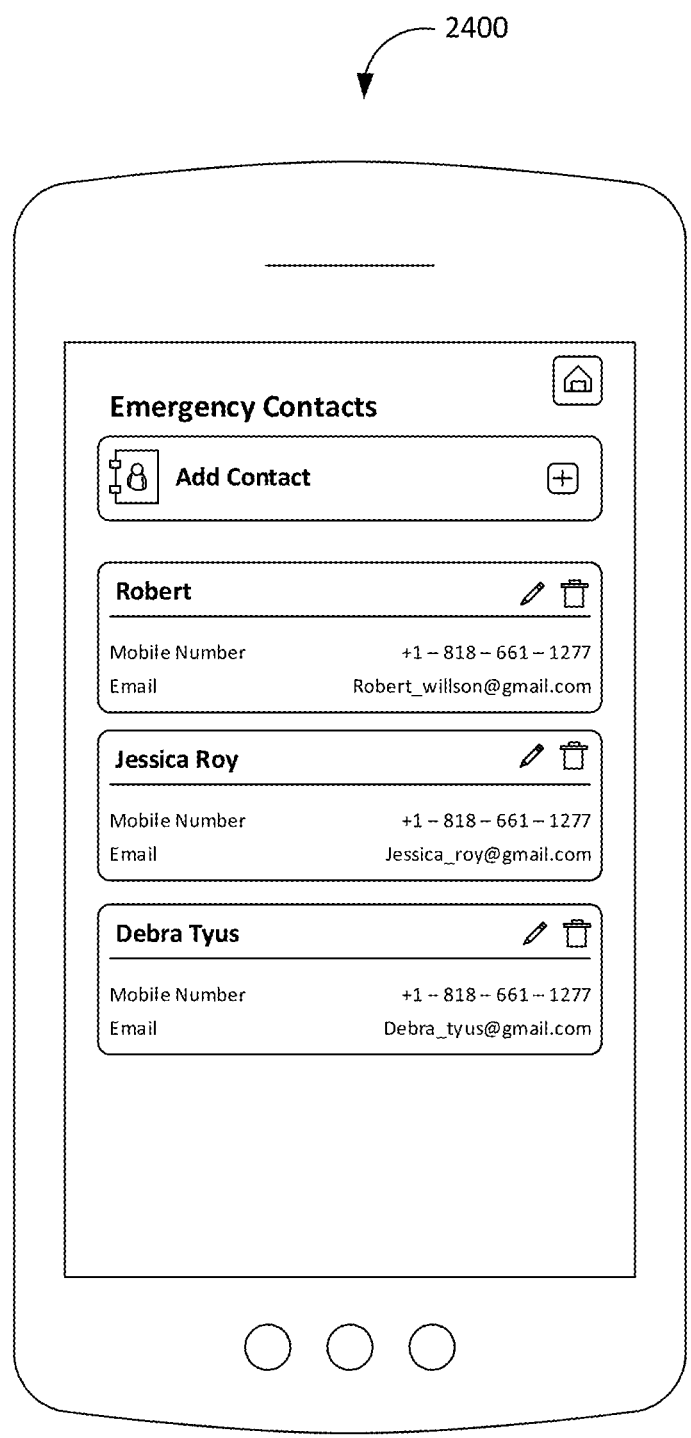
FIG. 24 illustrates a user interface of the application, in accordance with some embodiments.
Figure 25:
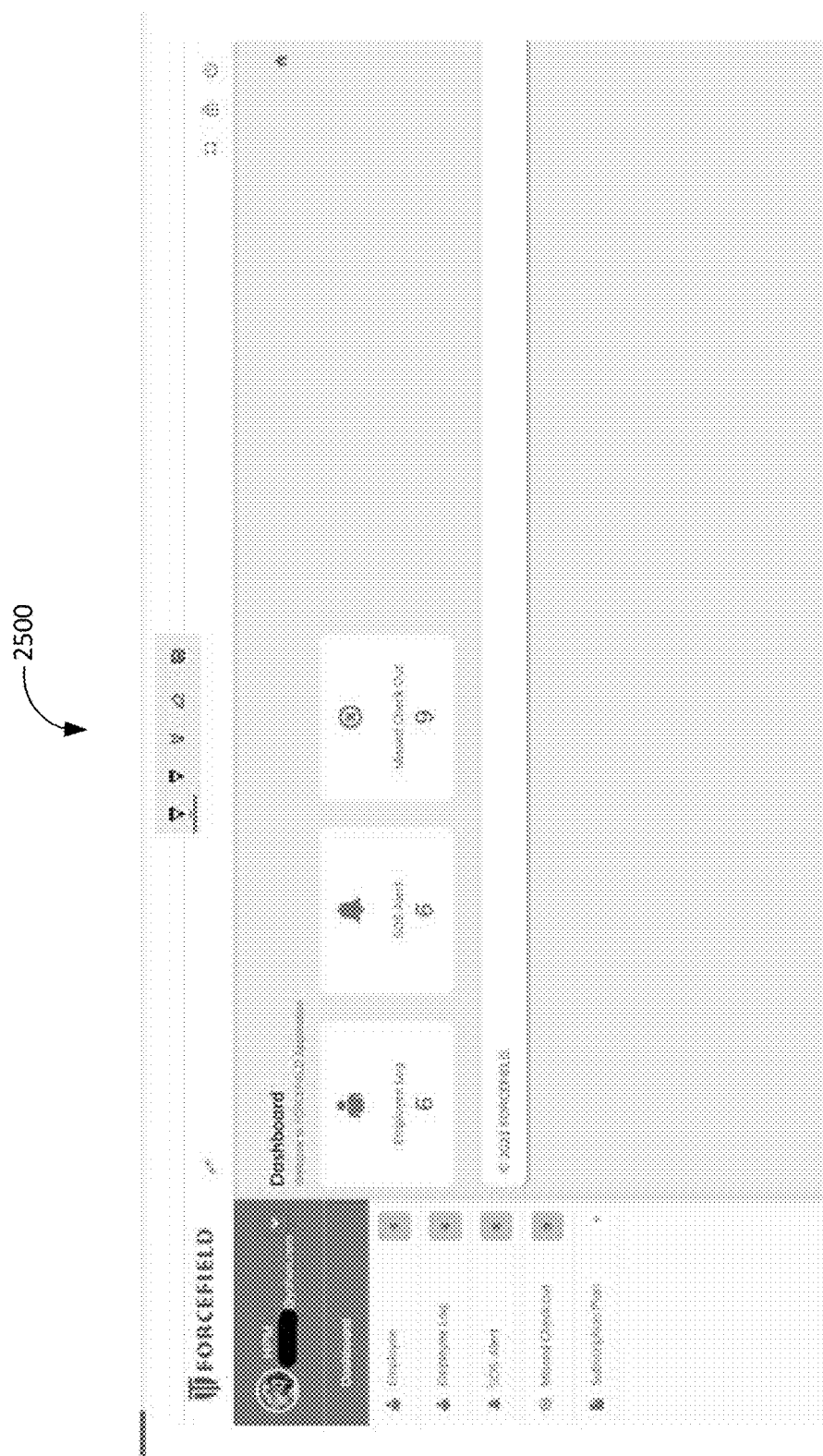
FIG. 25 illustrates a user interface of the application, in accordance with some embodiments.

A fifth capability of Forcefield Security app is to utilize some additional features, which include the following:
Profile: create a USER profile with USER name, email, and phone number & Company name, Company email, and Company phone number.
Settings: Change password, Help/FAQ, Terms and Privacy Policy, About Us, Contact Us, & Log Out
Emergency Contact: USER enters up to 3 Emergency Contact mobile phone numbers and emails. These are the contacts that will be notified as described in #1 and #3 (as shown in FIG. 24)
Login: Done at the beginning of using the Forcefield App
Tutorial: Viewable before beginning use of the Forcefield App A sixth capability of Forcefield Security app is the Company Panel (as shown in FIG. 25), which is a web interface extension of the app that allows the USER's employer to see where they are while out in the field. The app can be utilized for organizations with one or more employees. The company panel securely display the USER: location in the field (geolocation, interactive map), check-ins, check-outs, any missed check-out times, any SOS alerts, and the USER's field log. The information is displayed when the category on the left-hand menu bar is clicked on. These are all important features to help the safety of the USER and aid any security officials or law enforcement in investigations.

Further, the App may provide a feature of Wellness and Self Care Education: Through push notifications, this feature will help workers in the field with mental resilience and stress management through educational and encouraging videos, pictures, and messaging.

The Forcefield App provides a security line of protection for workers alone in the field that also allows them to cry for help even when they can't.

Further, the present disclosure describes a machine process that will collect data on "missed check-outs" and "SOS" notifications and will use that information as a security and accountability feature that will notify the USER and ADMIN of this pattern. This information will allow the USER and ADMIN to put in any extra security or protocols for these particular times and locations.

Further, the present disclosure describes a method for an app. More specifically, the present disclosure describes is a method for an app designed to provide a security line of protection for workers alone in the field.

Further, the present disclosure describes a Forcefield App. Further, the Forcefield App is a unique combination of existing technology that provides a unique utility to its category of Security. The Forcefield App provides a security line of protection for workers alone in the field.

FIG. 1 is an illustration of an online platform 100 consistent with various embodiments of the present disclosure. By way of non-limiting example, the online platform 100 to enable providing protection to users working in a field may be hosted on a centralized server 102, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers, etc.), databases 114, and sensors 116 over a communication network 104, such as, but not limited to, the Internet. Further, users of the online platform 100 may include relevant parties such as, but not limited to, end-users, administrators, service providers, service consumers, and so on. Accordingly, in some instances, electronic devices operated by the one or more relevant parties may be in communication with the platform.

A user 112, such as the one or more relevant parties, may access online platform 100 through a web based software application or browser. The web based software application may be embodied as, for example, but not be limited to, a website, a web application, a desktop application, and a mobile application compatible with a computing device 200.

Figure 2:
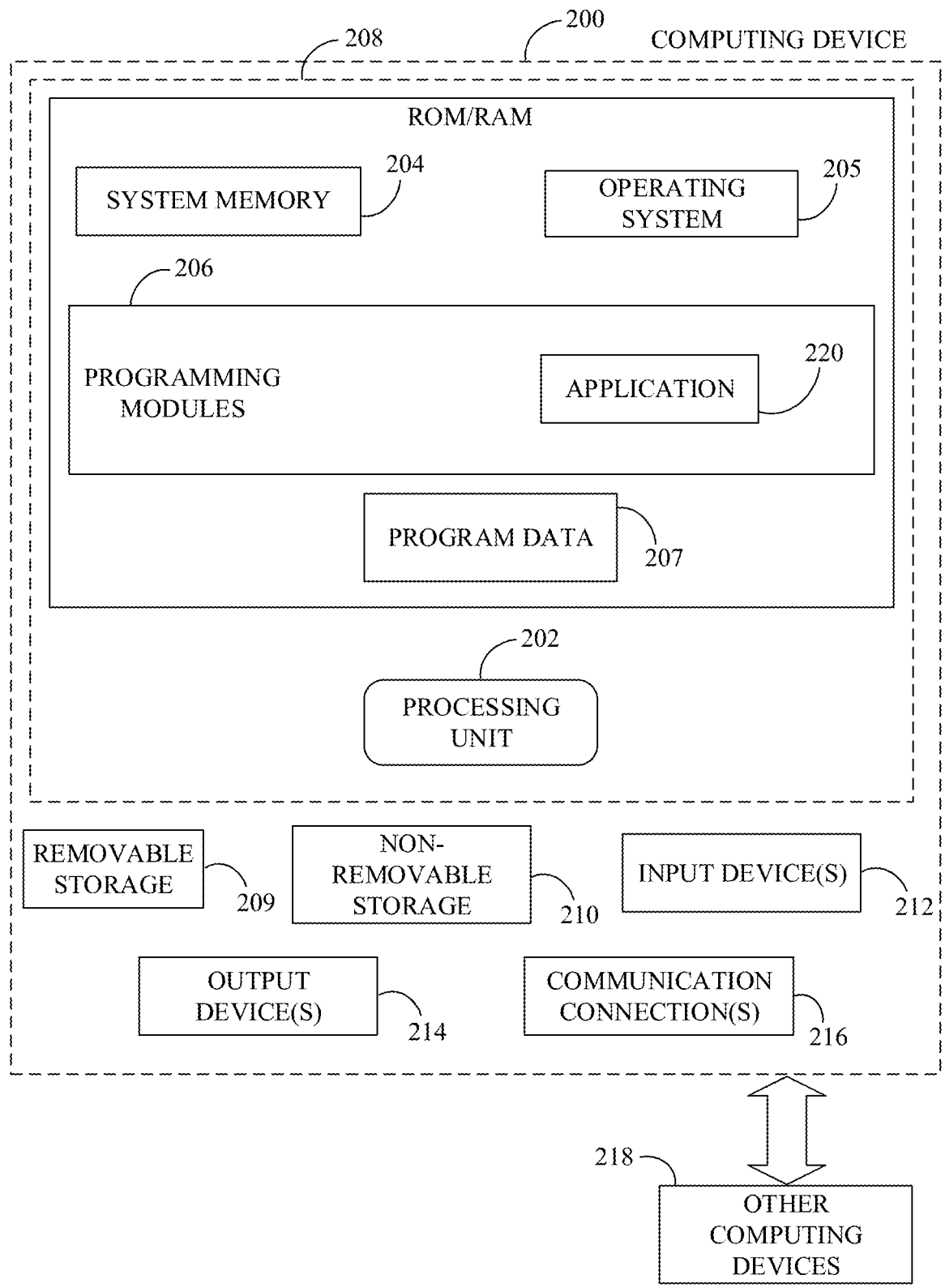
FIG. 2 is a block diagram of a computing device for implementing the methods disclosed herein, in accordance with some embodiments.

With reference to FIG. 2, a system consistent with an embodiment of the disclosure may include a computing device or cloud service, such as computing device 200. In a basic configuration, computing device 200 may include at least one processing unit 202 and a system memory 204. Depending on the configuration and type of computing device, system memory 204 may comprise, but is not limited to, volatile (e.g., random-access memory (RAM)), non-volatile (e.g., read-only memory (ROM)), flash memory, or any combination. System memory 204 may include operating system 205, one or more programming modules 206, and may include a program data 207. Operating system 205, for example, may be suitable for controlling computing device 200's operation. In one embodiment, programming modules 206 may include image-processing module, machine learning module. Furthermore, embodiments of the disclosure may be practiced in conjunction with a graphics library, other operating systems, or any other application program and is not limited to any particular application or system. This basic configuration is illustrated in FIG. 2 by those components within a dashed line 208.

Computing device 200 may have additional features or functionality. For example, computing device 200 may also include additional data storage devices (removable and/or non-removable) such as, for example, magnetic disks, optical disks, or tape. Such additional storage is illustrated in FIG. 2 by a removable storage 209 and a non-removable storage 210. Computer storage media may include volatile and non-volatile, removable and non-removable media implemented in any method or technology for storage of information, such as computer-readable instructions, data structures, program modules, or other data. System memory 204, removable storage 209, and non-removable storage 210 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 200. Any such computer storage media may be part of device 200. Computing device 200 may also have input device(s) 212 such as a keyboard, a mouse, a pen, a sound input device, a touch input device, a location sensor, a camera, a biometric sensor, etc. Output device(s) 214 such as a display, speakers, a printer, etc. may also be included. The aforementioned devices are examples and others may be used.

Computing device 200 may also contain a communication connection 216 that may allow device 200 to communicate with other computing devices 218, such as over a network in a distributed computing environment, for example, an intranet or the Internet. Communication connection 216 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 204, including operating system 205. While executing on processing unit 202, programming modules 206 (e.g., application 220 such as a media player) may perform processes including, for example, one or more stages of methods, algorithms, systems, applications, servers, databases as described above. The aforementioned process is an example, and processing unit 202 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Figure 3:
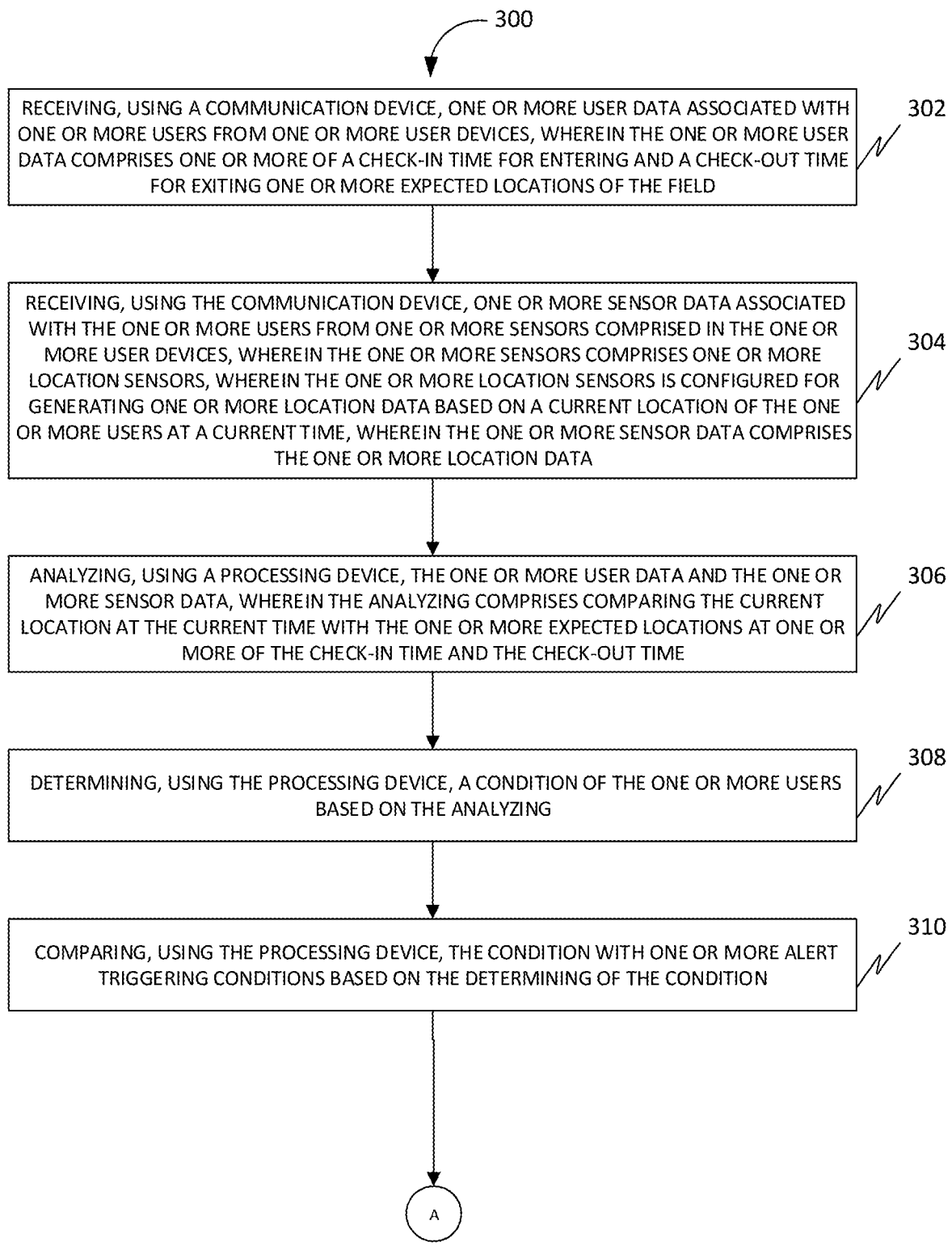
FIG. 3 is a flow chart of a method for providing protection to users working in a field, in accordance with some embodiments.

FIG. 3 is a flow chart of a method 300 for providing protection to users working in a field, in accordance with some embodiments.

Further, the method 300 may include a step 302 of receiving, using a communication device, one or more user data associated with one or more users from one or more user devices. Further, the one or more user data may include one or more of a check-in time for entering and a check-out time for exiting one or more expected locations of the field. Further, the one or more users may include home health care nurses, real estate agents, social workers, plumbers, agents, etc.). Further, the one or more expected locations may include geographical areas.

Further, the method 300 may include a step 304 of receiving, using the communication device, one or more sensor data associated with the one or more users from one or more sensors included in the one or more user devices. Further, the one or more sensors may include one or more location sensors. Further, the one or more location sensors may be configured for generating one or more location data based on a current location of the one or more users at a current time. Further, the one or more sensor data may include the one or more location data. Further, the current location may include a geographical area.

Further, the method 300 may include a step 306 of analyzing, using a processing device, the one or more user data and the one or more sensor data. Further, the analyzing may include comparing the current location at the current time with the one or more expected locations at one or more of the check-in time and the check-out time.

Further, the method 300 may include a step 308 of determining, using the processing device, a condition of the one or more users based on the analyzing. Further, the condition may include distress, stress, trapped, captured, lost, etc. Further, the condition may be defined by a length of one or more time intervals for which the current location of the one or more users may be the one or more expected locations past the check-out time. Further, the condition may include one or more time intervals for which the current location of the one or more users may not be the one or more expected locations past the check-in time.

Further, the method 300 may include a step 310 of comparing, using the processing device, the condition with one or more alert triggering conditions based on the determining of the condition. Further, the one or more alert triggering conditions may be defined by an alerting length of the one or more time intervals.

Accordingly, in some embodiments, as a result of automatically determining a distress condition, the one or more users are not required to expressly indicate a call for help by performing actions such as, calling, texting, crying out or do anything to notify their emergency contacts that they are in distress.

Figure 4:
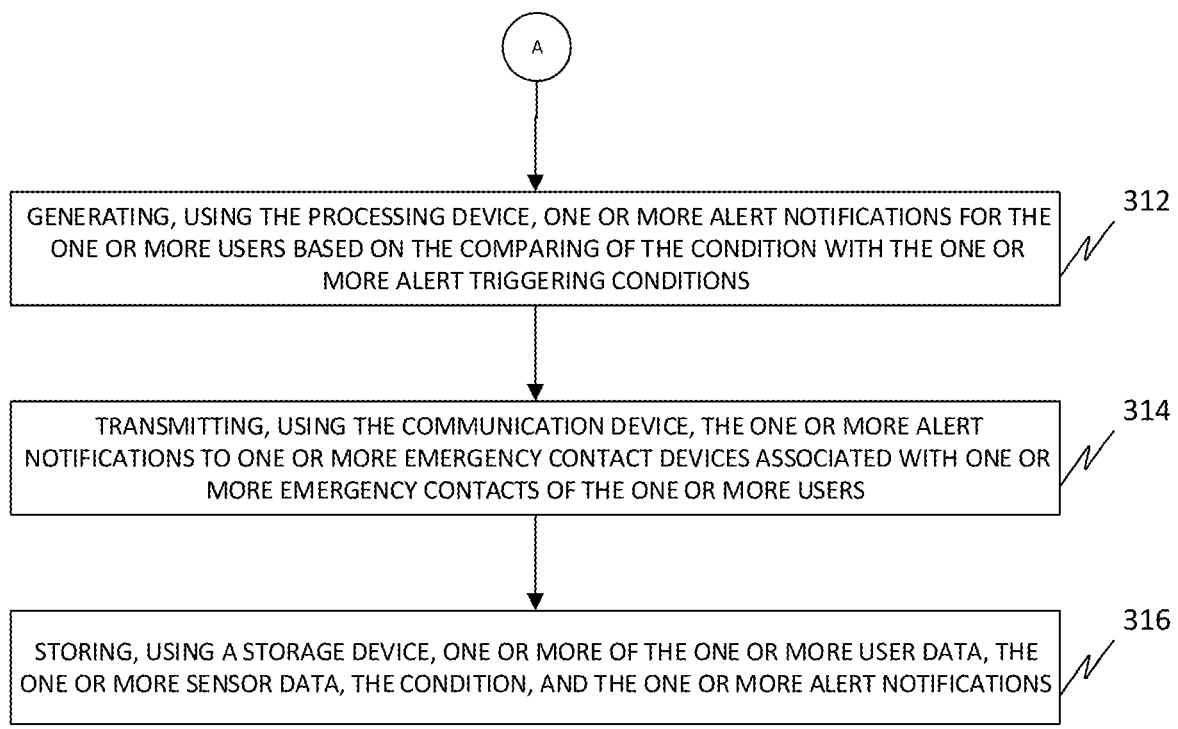
FIG. 4 is a continuation flow chart of FIG. 3.

FIG. 4 is a continuation flow chart of FIG. 3.

Further, the method 300 may include a step 312 of generating, using the processing device, one or more alert notifications for the one or more users based on the comparing of the condition with the one or more alert triggering conditions. Further, the one or more alert notifications may include one or more indications of the condition of the one or more users.

Further, the method 300 may include a step 314 of transmitting, using the communication device, the one or more alert notifications to one or more emergency contact devices associated with one or more emergency contacts of the one or more users. Further, the one or more emergency contacts may include one or more individuals that may help the one or more users with the condition.

Further, the method 300 may include a step 316 of storing, using a storage device, one or more of the one or more user data, the one or more sensor data, the condition, and the one or more alert notifications.

Figure 5:
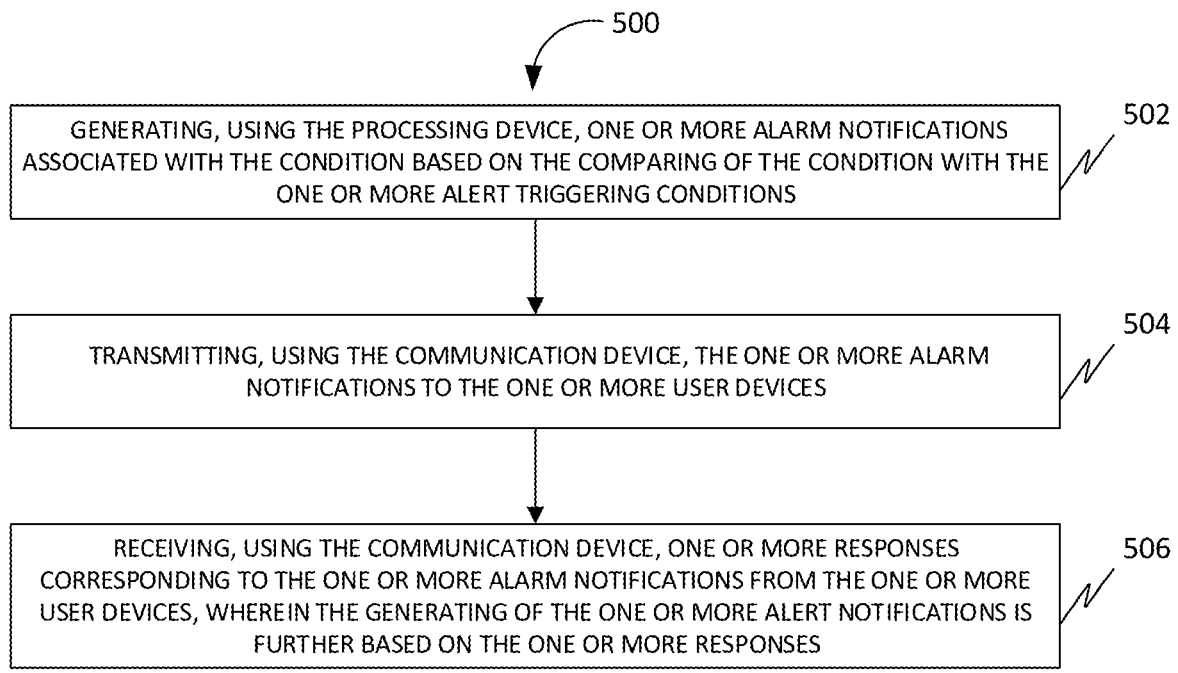
FIG. 5 is a flow chart of the method for providing protection to users working in the field in which the method further may include receiving, one or more responses corresponding to the one or more alarm notifications from the one or more user devices, in accordance with some embodiments.

FIG. 5 is a flow chart of a method 500 for providing protection to users working in a field in which the method 500 further may include receiving, one or more responses corresponding to the one or more alarm notifications from the one or more user devices, in accordance with some embodiments. Further, the method 500 may include a step 502 of generating, using the processing device, one or more alarm notifications associated with the condition based on the comparing of the condition with the one or more alert triggering conditions. Further, the one or more alarm notifications may include one or more indications of the condition of the one or more users. Further, the method 500 may include a step 504 of transmitting, using the communication device, the one or more alarm notifications to the one or more user devices. Further, the method 500 may include a step 506 of receiving, using the communication device, one or more responses corresponding to the one or more alarm notifications from the one or more user devices. Further, the generating of the one or more alert notifications may be further based on the one or more responses.

Figure 6:
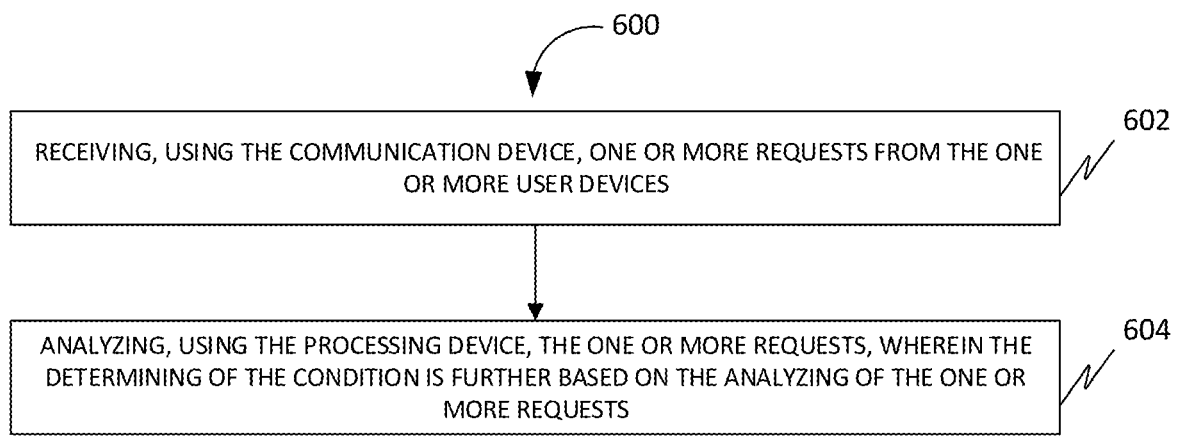
FIG. 6 is the flow chart of the method for providing protection to users working in the field in which the method further may include analyzing, the one or more requests, in accordance with some embodiments.

FIG. 6 is a flow chart of a method 600 for providing protection to users working in a field in which the method 600 further may include analyzing, the one or more requests, in accordance with some embodiments. Further, the method 600 may include a step 602 of receiving, using the communication device, one or more requests from the one or more user devices. Further, the one or more requests may include SOS request signals. Further, the method 600 may include a step 604 of analyzing, using the processing device, the one or more requests. Further, the determining of the condition may be further based on the analyzing of the one or more requests.

Figure 7:
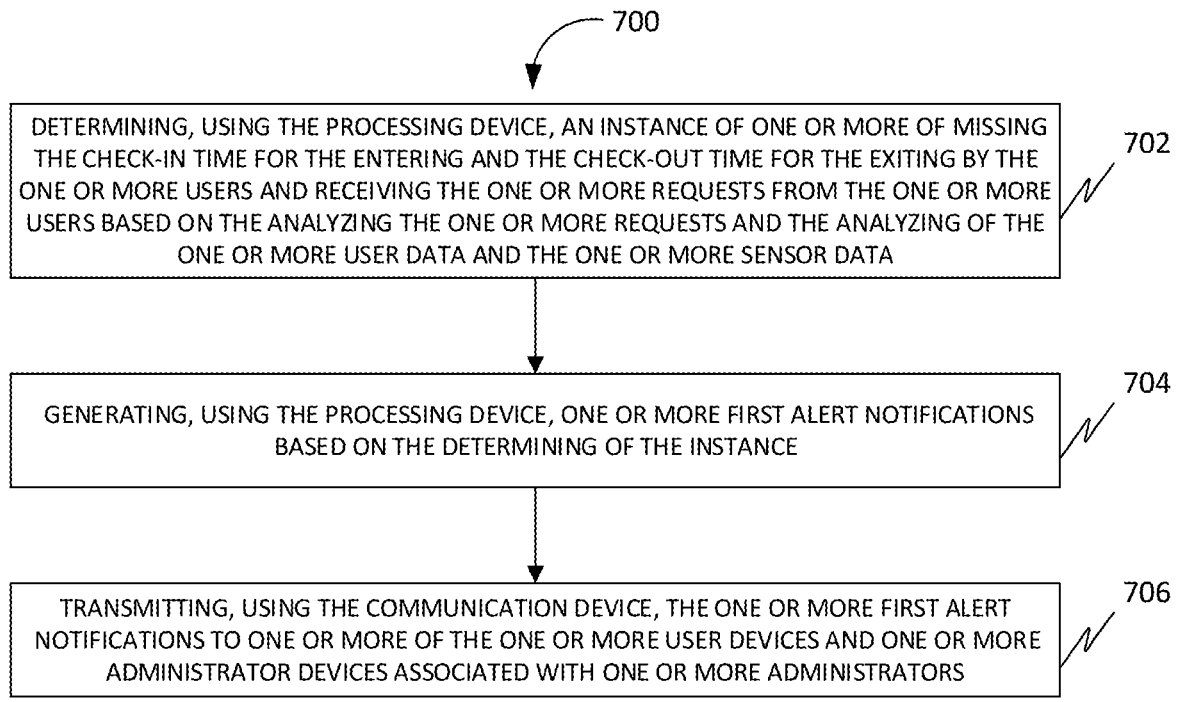
FIG. 7 is the flow chart of the method for providing protection to users working in the field in which the method further may include transmitting, the one or more first alert notifications to one or more of the one or more user devices and one or more administrator devices associated with one or more administrators, in accordance with some embodiments.

FIG. 7 is a flow chart of a method 700 for providing protection to users working in a field in which the method 700 further may include transmitting, the one or more first alert notifications to one or more of the one or more user devices and one or more administrator devices associated with one or more administrators, in accordance with some embodiments. Further, at 702, the method 700 may include determining, using the processing device, an instance of one or more of missing the check-in time for the entering and the check-out time for the exiting by the one or more users and receiving the one or more requests from the one or more users based on the analyzing the one or more requests and the analyzing of the one or more user data and the one or more sensor data. Further, at 704, the method 700 may include generating, using the processing device, one or more first alert notifications based on the determining of the instance. Further, the one or more first alert notifications may include one or more indications of one or more of the missing of the check-in time for the entering and the check-out time for the exiting by the one or more users and the receiving of the one or more requests from the one or more users. Further, at 706, the method 700 may include transmitting, using the communication device, the one or more first alert notifications to one or more of the one or more user devices and one or more administrator devices associated with one or more administrators.

Figure 8:
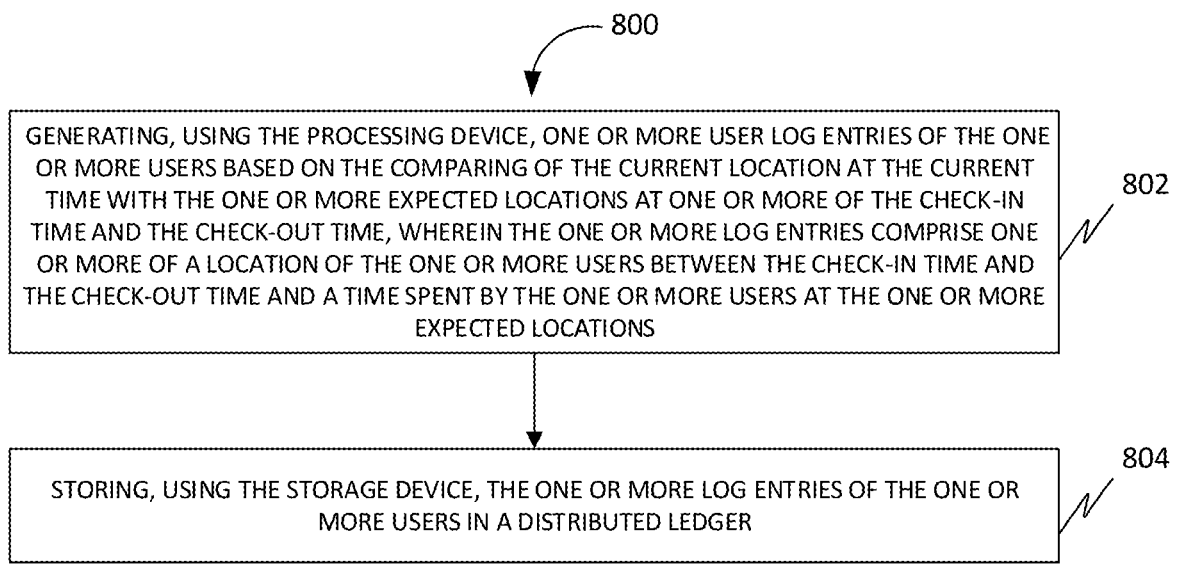
FIG. 8 is the flow chart of the method for providing protection to users working in the field in which the method further may include storing, using a storage device, the one or more log entries of the one or more users in a distributed ledger, in accordance with some embodiments.

FIG. 8 is a flow chart of a method 800 for providing protection to users working in a field in which the method 800 further may include storing, using the storage device, the one or more log entries of the one or more users in a distributed ledger, in accordance with some embodiments. Further, at 802, the method 800 may include generating, using the processing device, one or more user log entries of the one or more users based on the comparing of the current location at the current time with the one or more expected locations at one or more of the check-in time and the check-out time. Further, the one or more log entries may include one or more of a location of the one or more users between the check-in time and the check-out time and a time spent by the one or more users at the one or more expected locations. Further, at 804, the method 800 may include storing, using the storage device, the one or more log entries of the one or more users in a distributed ledger.

Figure 9:
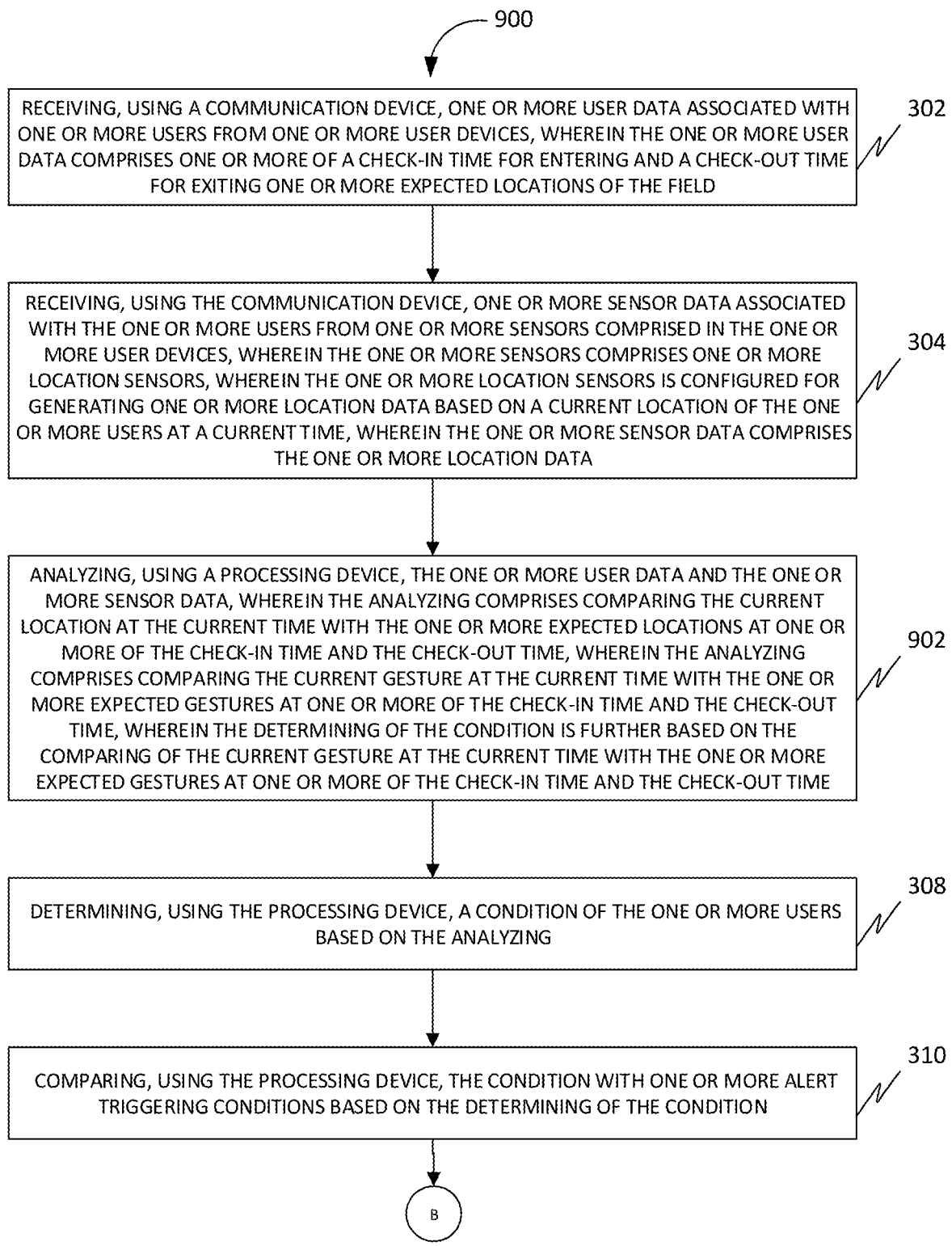
FIG. 9 is the flow chart of the method for providing protection to users working in the field in which the method further may include comparing current gesture at the current time with one or more expected gestures at one or more of the check-in time and the check-out time, in accordance with some embodiments.
Figure 10:
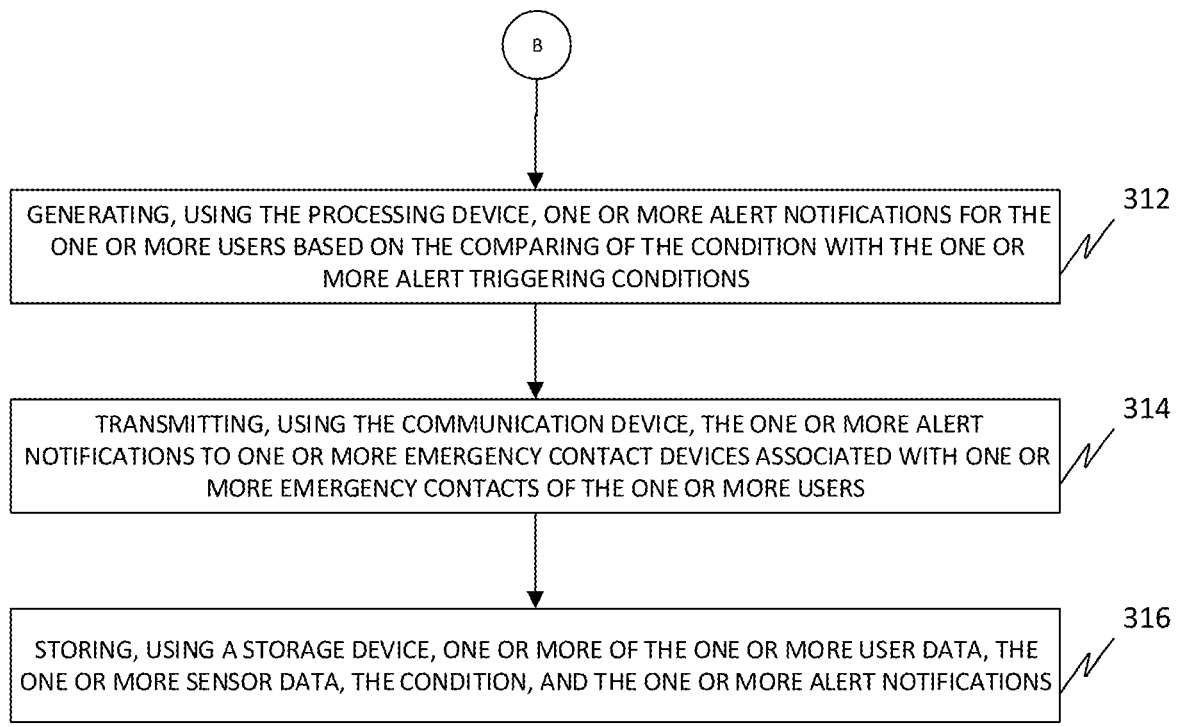
FIG. 10 is the continuation flow chart of FIG. 9.

FIG. 9 is a flow chart of a method 900 for providing protection to users working in a field in which the method 900 further may include comparing current gesture at the current time with one or more expected gestures at one or more of the check-in time and the check-out time, in accordance with some embodiments. Further, the one or more user data may include one or more expected gestures made by the one or more users at one or more of the check-in time and the check-out time. Further, the one or more sensors may include one or more gesture sensors. Further, the one or more gesture sensors may be configured for generating one or more gesture data based on a current gesture made by the one or more users at the current time. Further, the one or more sensor data may include the one or more gesture data. Further, the one or more expected gestures may include one or more hand gestures, one or more head gestures, one or more leg gestures, one or more face gestures, one or more facial expressions, etc. Further, the current gesture may include a hand gesture, a head gesture, a leg gesture, a face gesture, a facial expression, etc. Further, at 902, the method 900 may include analyzing, using a processing device, the one or more user data and the one or more sensor data. Further, the analyzing may include comparing the current location at the current time with the one or more expected locations at one or more of the check-in time and the check-out time, wherein the analyzing may include comparing the current gesture at the current time with the one or more expected gestures at one or more of the check-in time and the check-out time. Further, the determining of the condition may be further based on the comparing of the current gesture at the current time with the one or more expected gestures at one or more of the check-in time and the check-out time. FIG. 10 is a continuation flow chart of FIG. 9.

Figure 11:
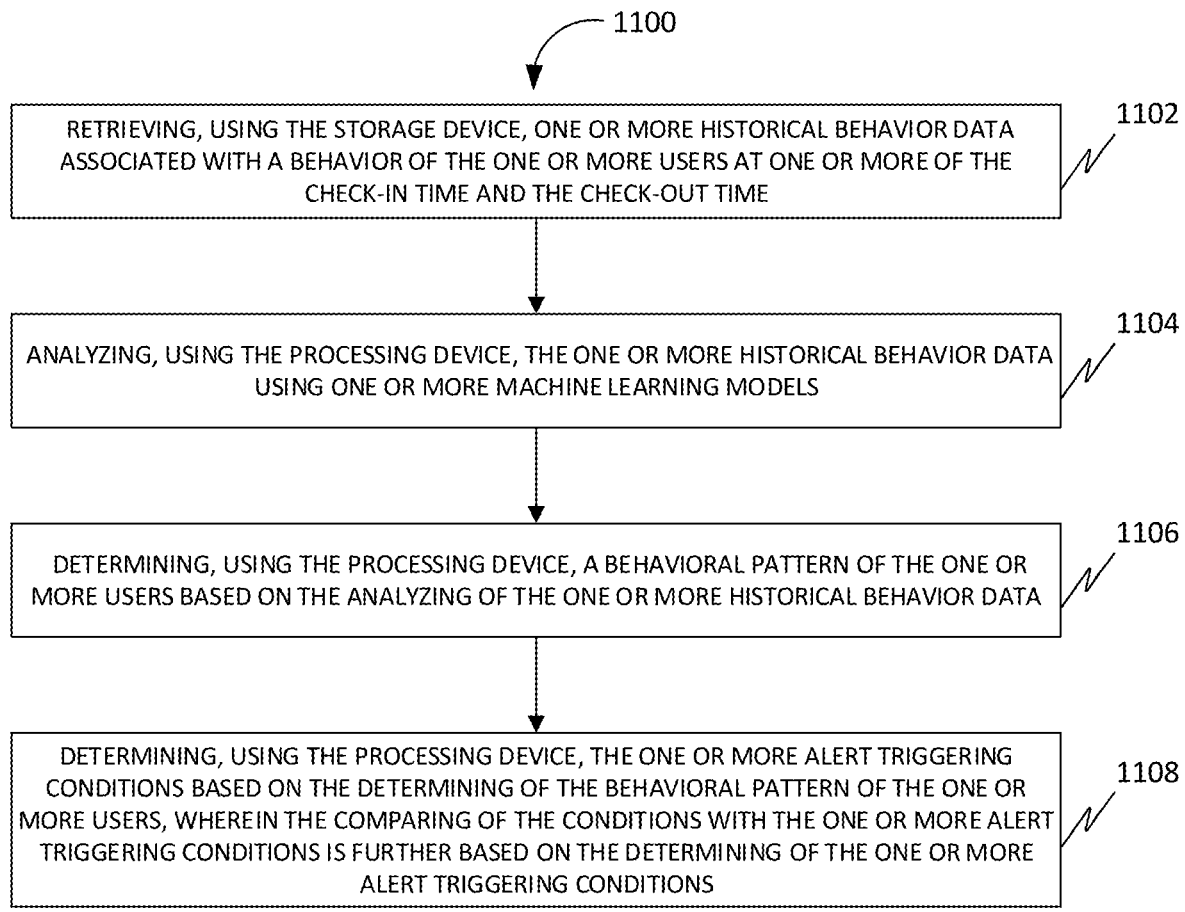
FIG. 11 is the flow chart of the method for providing protection to users working in the field in which the method further may include determining, the one or more alert triggering conditions based on the determining of a behavioral pattern of the one or more users, in accordance with some embodiments.

FIG. 11 is a flow chart of a method 1100 for providing protection to users working in a field in which the method 1100 further may include determining, the one or more alert triggering conditions based on the determining of the behavioral pattern of the one or more users, in accordance with some embodiments. Further, at 1102, the method 1100 may include retrieving, using the storage device, one or more historical behavior data associated with a behavior of the one or more users at one or more of the check-in time and the check-out time. Further, at 1104, the method 1100 may include analyzing, using the processing device, the one or more historical behavior data using one or more machine learning models. Further, at 1106, the method 1100 may include determining, using the processing device, a behavioral pattern of the one or more users based on the analyzing of the one or more historical behavior data. Further, at 1108, the method 1100 may include determining, using the processing device, the one or more alert triggering conditions based on the determining of the behavioral pattern of the one or more users. Further, the comparing of the conditions with the one or more alert triggering conditions may be further based on the determining of the one or more alert triggering conditions.

Figure 12:
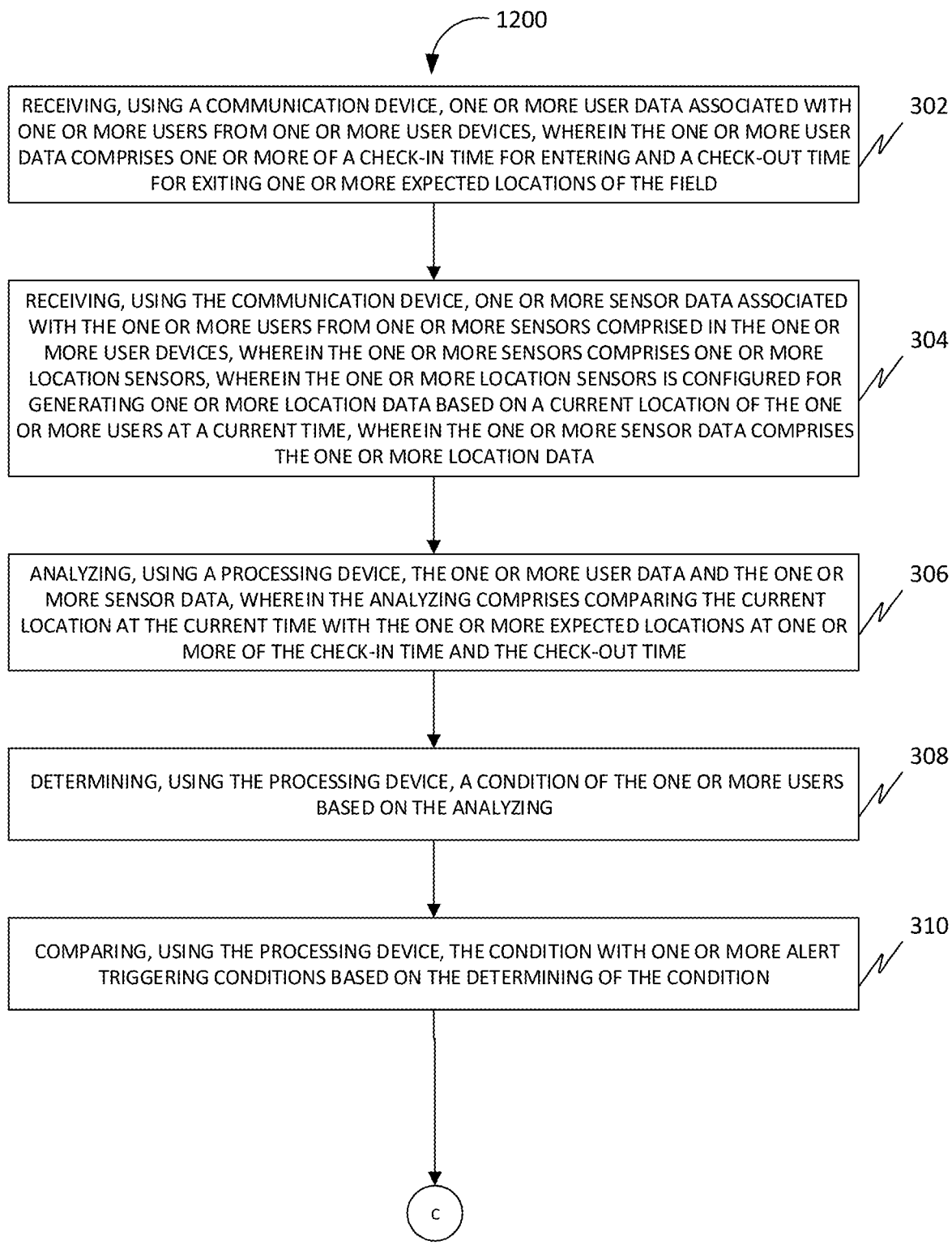
FIG. 12 is a flow chart of the method for providing protection to users working in the field in which the method further may include storing, one or more of the one or more user data, the one or more sensor data, the condition, and the one or more alert notifications wherein a storing may include storing one or more of the one or more user data, the one or more sensor data, the condition, and the one or more alert notifications in a distributed ledger, in accordance with some embodiments.
Figure 13:
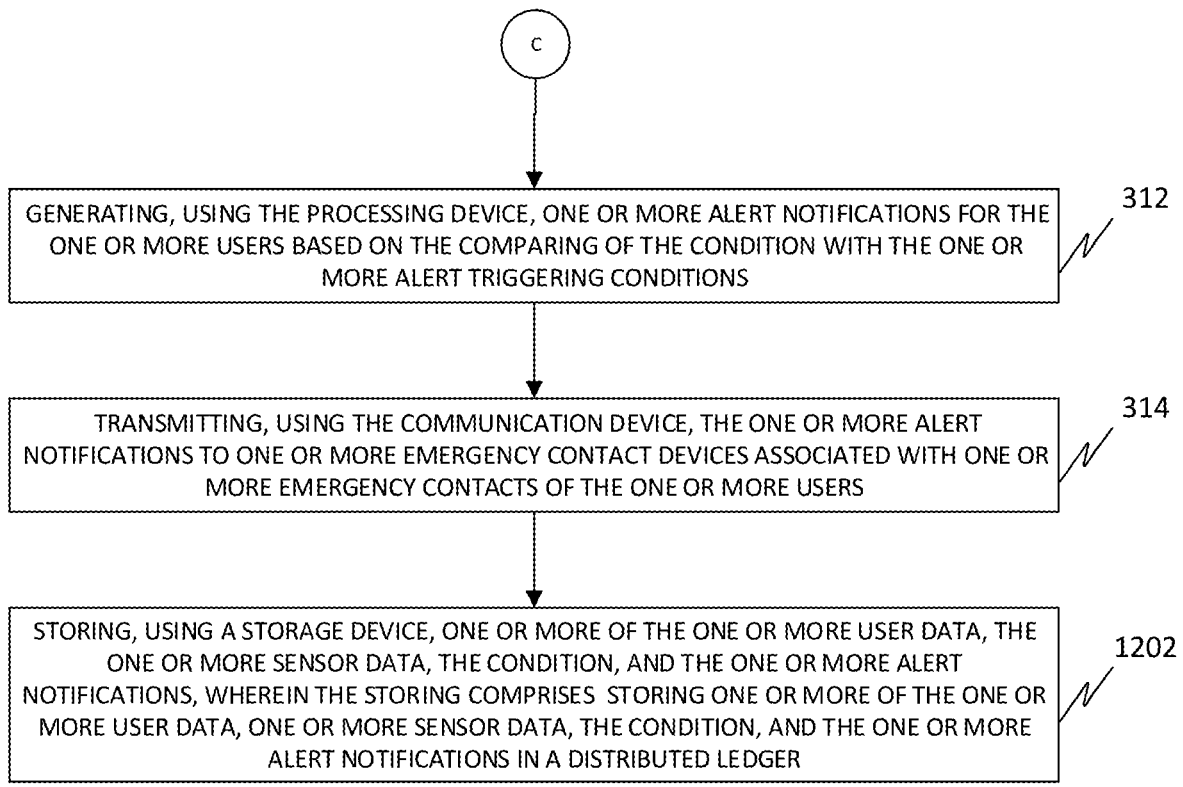
FIG. 13 is the continuation flow chart of FIG. 12.

FIG. 12 is a flow chart of a method 1200 for providing protection to users working in a field in which the method 1200 further may include storing, one or more of the one or more user data, the one or more sensor data, the condition, and the one or more alert notifications wherein the storing may include storing one or more of the one or more user data, the one or more sensor data, the condition, and the one or more alert notifications in a distributed ledger, in accordance with some embodiments. FIG. 13 is a continuation flow chart of FIG. 12. Further, at 1202, the method 1200 may include storing, using a storage device, one or more of the one or more user data, the one or more sensor data, the condition, and the one or more alert notifications, wherein the storing may include storing one or more of the one or more user data, the one or more sensor data, the condition, and the one or more alert notifications in a distributed ledger.

Figure 14:
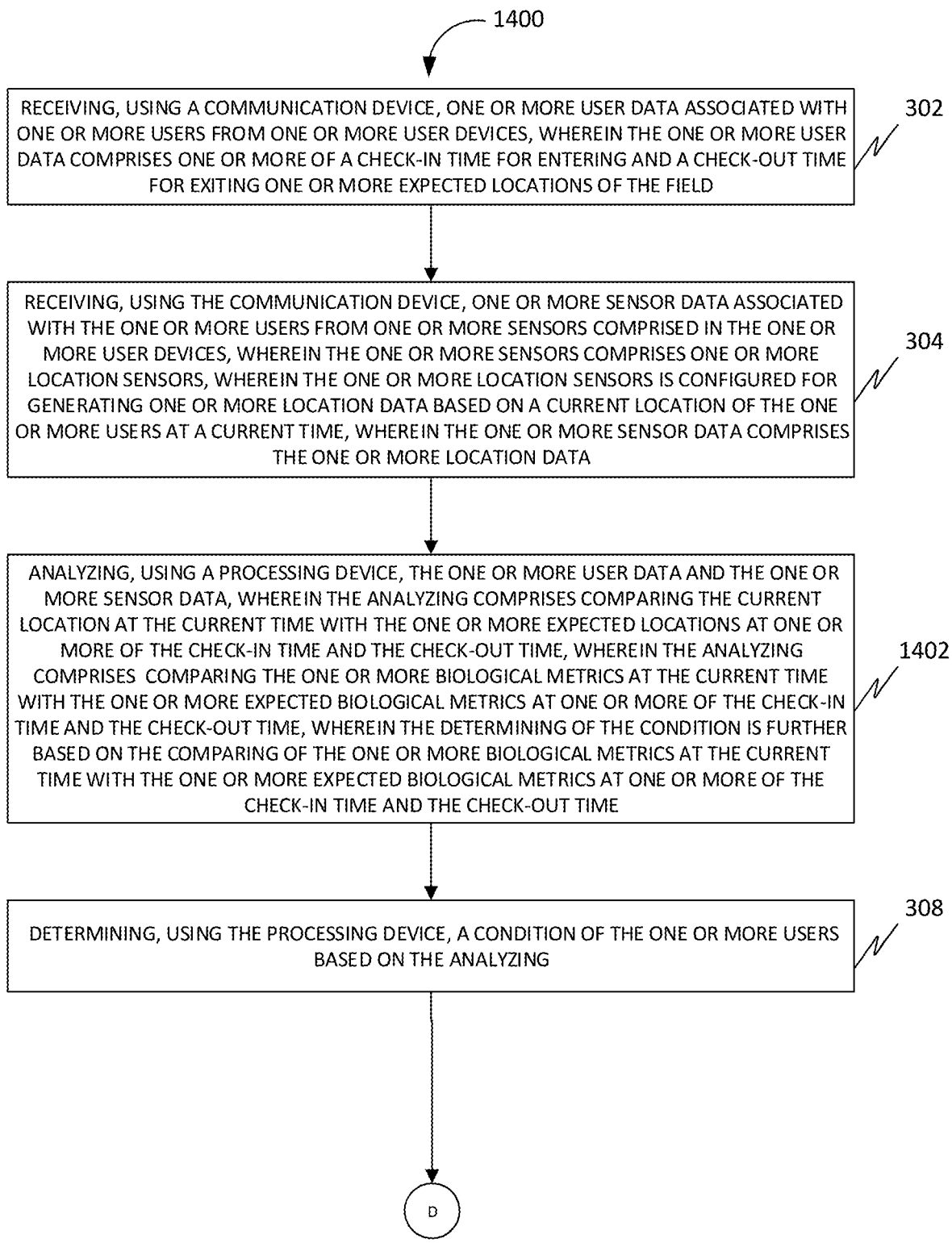
FIG. 14 is the flow chart of the method for providing protection to users working in the field in which the method further may include comparing one or more biological metrics at the current time with one or more expected biological metrics at one or more of the check-in time and the check-out time, in accordance with some embodiments.
Figure 15:
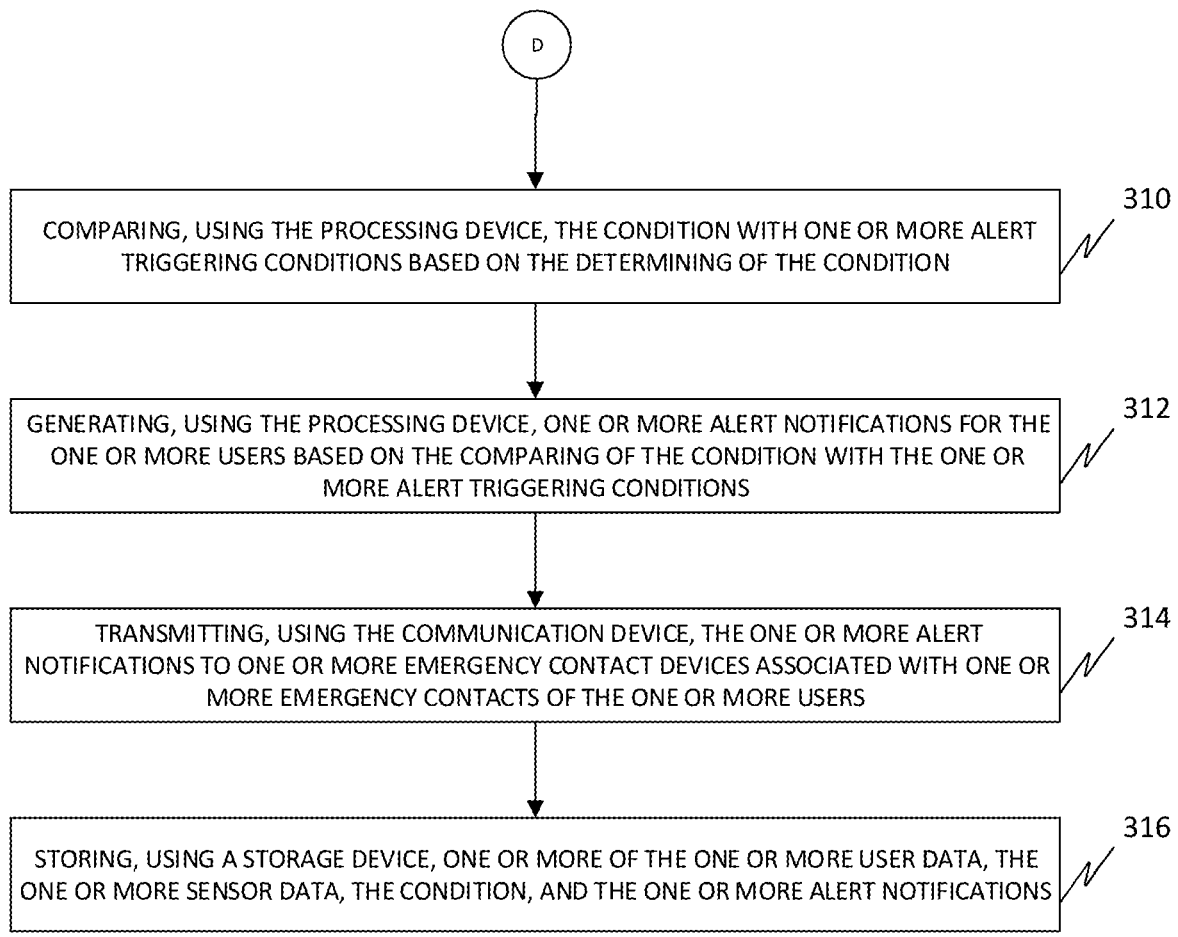
FIG. 15 is the continuation flow chart of FIG. 14.

FIG. 14 is a flow chart of a method 1400 for providing protection to users working in a field in which the method 1400 further may include comparing one or more biological metrics at the current time with one or more expected biological metrics at one or more of the check-in time and the check-out time, in accordance with some embodiments. Further, the one or more user data may include one or more expected biological metrics of the one or more users at one or more of the check-in time and the check-out time. Further, the one or more sensors may include one or more biological sensors. Further, the one or more biological sensors may be configured for generating one or more biological metrics based on one or more of a physical parameter and a physiological parameter of a body of the one or more users at the current time. Further, the one or more sensor data may include the one or more biological metrics. Further, the one or more expected biological metrics may include a heart rate, a respiration rate, a level of one or more body hormones, a body temperature, etc. Further, the one or more biological metrics may include a heart rate, a respiration rate, a level of one or more body hormones, a body temperature, etc. Further, the method 1400 may include a step 1402 of analyzing, using a processing device, the one or more user data and the one or more sensor data. Further, the analyzing may include comparing the current location at the current time with the one or more expected locations at one or more of the check-in time and the check-out time, wherein the analyzing may include comparing the one or more biological metrics at the current time with the one or more expected biological metrics at one or more of the check-in time and the check-out time. Further, the determining of the condition may be further based on the comparing of the one or more biological metrics at the current time with the one or more expected biological metrics at one or more of the check-in time and the check-out time. FIG. 15 is a continuation flow chart of FIG. 14.

Figure 16:
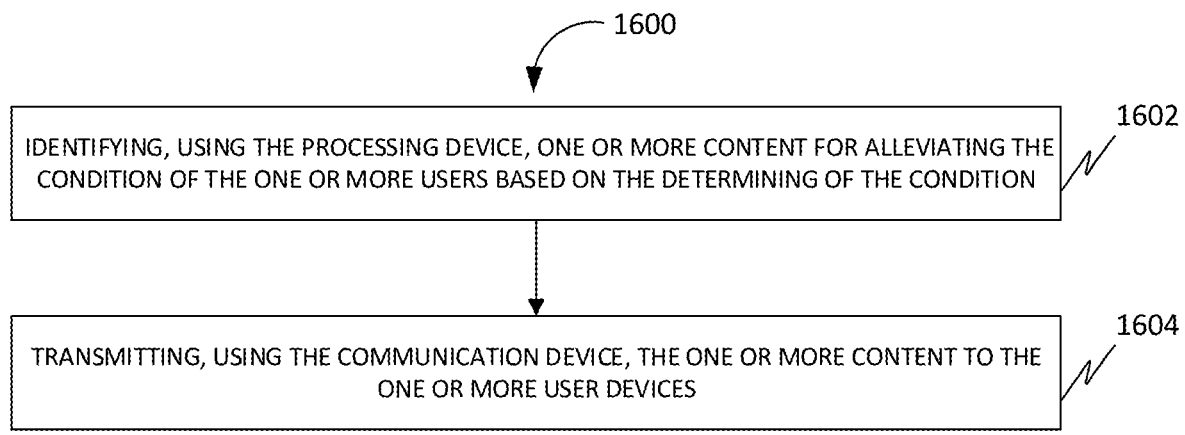
FIG. 16 is the flow chart of the method for providing protection to users working in the field in which the method further may include transmitting, the one or more content to the one or more user devices, in accordance with some embodiments.

FIG. 16 is a flow chart of a method 1600 for providing protection to users working in a field in which the method 1600 further may include transmitting, the one or more content to the one or more user devices, in accordance with some embodiments. Further, at 1602, the method 1600 may include identifying, using the processing device, one or more content for alleviating the condition of the one or more users based on the determining of the condition. Further, at 1604, the method 1600 may include transmitting, using the communication device, the one or more content to the one or more user devices. Further, the one or more content may include educational and encouraging videos, pictures, and messages.

Figure 17:
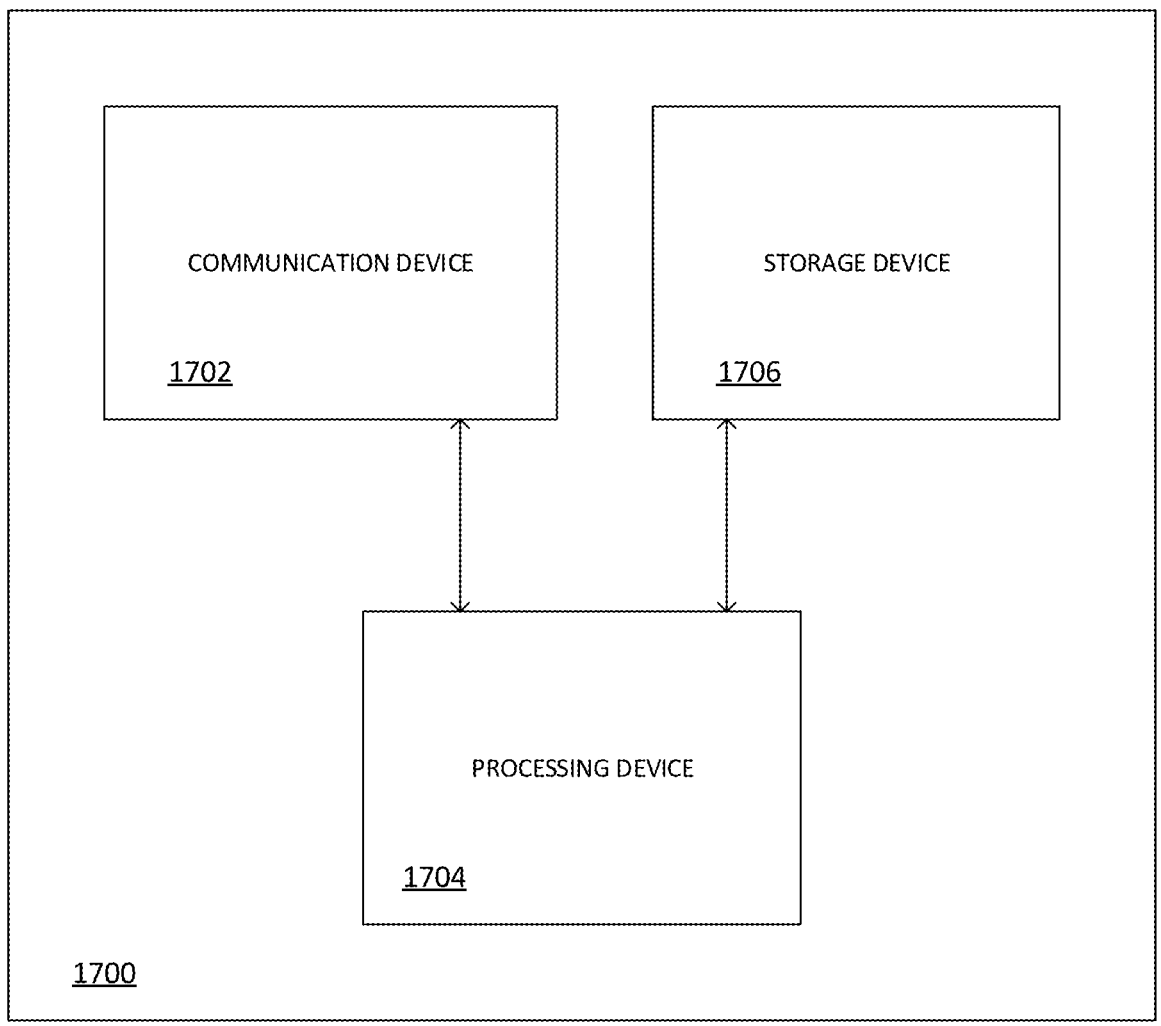
FIG. 17 is a block diagram of a system for providing protection to users working in the field, in accordance with some embodiments.

FIG. 17 is a block diagram of a system 1700 for providing protection to users working in a field, in accordance with some embodiments. The system 1700 may include a communication device 1702, a processing device 1704, and a storage device 1706.

Further, the communication device 1702 may be configured for performing a step of receiving one or more user data associated with one or more users from one or more user devices. Further, the one or more user data may include one or more of a check-in time for entering and a check-out time for exiting one or more expected locations of the field.

Further, the communication device 1702 may be configured for performing a step of receiving one or more sensor data associated with the one or more users from one or more sensors included in the one or more user devices. Further, the one or more sensors may include one or more location sensors. Further, the one or more location sensors may be configured for generating one or more location data based on a current location of the one or more users at a current time. Further, the one or more sensor data may include the one or more location data.

Further, the communication device 1702 may be configured for performing a step of transmitting one or more alert notifications to one or more emergency contact devices associated with one or more emergency contacts of the one or more users.

The processing device 1704 may be communicatively coupled with the communication device 1702.

Further, the processing device 1704 may be configured for performing a step of analyzing the one or more user data and the one or more sensor data. Further, the analyzing may include comparing the current location at the current time with the one or more expected locations at one or more of the check-in time and the check-out time.

Further, the processing device 1704 may be configured for performing a step of determining a condition of the one or more users based on the analyzing.

Further, the processing device 1704 may be configured for performing a step of comparing the condition with one or more alert triggering conditions based on the determining of the condition.

Further, the processing device 1704 may be configured for performing a step of generating the one or more alert notifications for the one or more users based on the comparing of the condition with the one or more alert triggering conditions.

The storage device 1706 may be communicatively coupled with the processing device 1704.

Further, the storage device 1706 may be configured for performing a step of storing one or more of the one or more user data, the one or more sensor data, the condition, and the one or more alert notifications.

In some embodiments, the storing may include storing one or more of the one or more user data, the one or more sensor data, the condition, and the one or more alert notifications in a distributed ledger.

In some embodiments, the one or more user data may include one or more expected gestures made by the one or more users at one or more of the check-in time and the check-out time. Further, the one or more sensors may include one or more gesture sensors. Further, the one or more gesture sensors may be configured for generating one or more gesture data based on a current gesture made by the one or more users at the current time, Further, the one or more sensor data may include the one or more gesture data. Further, the analyzing may include comparing the current gesture at the current time with the one or more expected gestures at one or more of the check-in time and the check-out time. Further, the determining of the condition may be further based on the comparing of the current gesture at the current time with the one or more expected gestures at one or more of the check-in time and the check-out time.

In some embodiments, the processing device 1704 may be configured for performing a step of generating one or more alarm notifications associated with the condition based on the comparing of the condition with the one or more alert triggering conditions. Further, the communication device 1702 may be configured for performing a step of transmitting the one or more alarm notifications to the one or more user devices. Further, the communication device 1702 may be configured for performing a step of receiving one or more responses corresponding to the one or more alarm notifications from the one or more user devices. Further, the generating of the one or more alert notifications may be further based on the one or more responses.

In some embodiments, the communication device 1702 may be configured for performing a step of receiving one or more requests from the one or more user devices. Further, the processing device 1704 may be configured for performing a step of analyzing the one or more requests. Further, the determining of the condition may be further based on the analyzing of the one or more requests.

In some embodiments, the processing device 1704 may be configured for performing a step of determining an instance of one or more of missing the check-in time for the entering and the check-out time for the exiting by the one or more users and receiving the one or more requests from the one or more users based on the analyzing the one or more requests and the analyzing of the one or more user data and the one or more sensor data. Further, the processing device 1704 may be configured for performing a step of generating one or more first alert notifications based on the determining of the instance. Further, the communication device 1702 may be configured for performing a step of transmitting the one or more first alert notifications to one or more of the one or more user devices and one or more administrator devices associated with one or more administrators.

In some embodiments, the processing device 1704 may be configured for performing a step of generating one or more user log entries of the one or more users based on the comparing of the current location at the current time with the one or more expected locations at one or more of the check-in time and the check-out time. Further, the one or more log entries may include one or more of a location of the one or more users between the check-in time and the check-out time and a time spent by the one or more users at the one or more expected locations. Further, the storage device 1706 may be configured for performing a step of storing the one or more log entries of the one or more users in a distributed ledger.

In some embodiments, the storage device 1706 may be configured for performing a step of retrieving one or more historical behavior data associated with a behavior of the one or more users at one or more of the check-in time and the check-out time. Further, the processing device 1704 may be configured for performing a step of analyzing the one or more historical behavior data using one or more machine learning models. Further, the processing device 1704 may be configured for performing a step of determining a behavioral pattern of the one or more users based on the analyzing of the one or more historical behavior data. Further, the processing device 1704 may be configured for performing a step of determining the one or more alert triggering conditions based on the determining of the behavioral pattern of the one or more users. Further, the comparing of the conditions with the one or more alert triggering conditions may be further based on the determining of the one or more alert triggering conditions.

In some embodiments, the one or more user data may include one or more expected biological metrics of the one or more users at one or more of the check-in time and the check-out time. Further, the one or more sensors may include one or more biological sensors. Further, the one or more biological sensors may be configured for generating one or more biological metrics based on one or more of a physical parameter and a physiological parameter of a body of the one or more users at the current time. Further, the one or more sensor data may include the one or more biological metrics. Further, the analyzing may include comparing the one or more biological metrics at the current time with the one or more expected biological metrics at one or more of the check-in time and the check-out time. Further, the determining of the condition may be further based on the comparing of the one or more biological metrics at the current time with the one or more expected biological metrics at one or more of the check-in time and the check-out time.

In some embodiments, the processing device 1704 may be configured for performing a step of identifying one or more content for alleviating the condition of the one or more users based on the determining of the condition. Further, the communication device 1702 may be configured for performing a step of transmitting the one or more content to the one or more user devices.

FIG. 18 illustrates a user interface 1800 of an application for providing protection to users working in a field, in accordance with some embodiments.

FIG. 19 illustrates a user interface 1900 of the application, in accordance with some embodiments.

FIG. 20 illustrates a user interface 2000 of the application, in accordance with some embodiments.

FIG. 21 illustrates a user interface 2100 of the application, in accordance with some embodiments.

FIG. 22 illustrates a user interface 2200 of the application, in accordance with some embodiments.

FIG. 23 illustrates a user interface 2300 of the application, in accordance with some embodiments.

FIG. 24 illustrates a user interface 2400 of the application, in accordance with some embodiments.

FIG. 25 illustrates a user interface 2500 of the application, in accordance with some embodiments.

FIG. 26 illustrates a user interface 2600 of an application for providing protection to users working in a field, in accordance with some embodiments.

FIG. 27 illustrates a user interface 2700 of the application, in accordance with some embodiments.

FIG. 28 illustrates a user interface 2800 of the application, in accordance with some embodiments.

FIG. 29 illustrates a user interface 2900 of the application, in accordance with some embodiments.

FIG. 30 illustrates a user interface 3000 of the application, in accordance with some embodiments.

FIG. 31 illustrates a user interface 3100 of the application, in accordance with some embodiments.

Although the present disclosure has been explained in relation to its preferred embodiment, it is to be understood that many other possible modifications and variations can be made without departing from the spirit and scope of the disclosure.

What is claimed is:

1. A method for providing protection to users working in a field, the method comprising:

receiving, using a communication device, one or more user data associated with one or more users from one or more user devices, wherein the one or more user data comprises one or more of a check-in time for entering and a check-out time for exiting one or more expected locations of the field;

receiving, using the communication device, one or more sensor data associated with the one or more users from one or more sensors comprised in the one or more user devices, wherein the one or more sensors comprises one or more location sensors, wherein the one or more location sensors is configured for generating one or more location data based on a current location of the one or more users at a current time, wherein the one or more sensor data comprises the one or more location data;

analyzing, using a processing device, the one or more user data and the one or more sensor data, wherein the analyzing comprises comparing the current location at the current time with the one or more expected locations at one or more of the check-in time and the check-out time;

determining, using the processing device, a condition of the one or more users based on the analyzing;

comparing, using the processing device, the condition with one or more alert triggering conditions based on the determining of the condition;

generating, using the processing device, one or more alert notifications for the one or more users based on the comparing of the condition with the one or more alert triggering conditions;

transmitting, using the communication device, the one or more alert notifications to one or more emergency contact devices associated with one or more emergency contacts of the one or more users; and storing, using a storage device, one or more of the one or more user data, the one or more sensor data, the condition, and the one or more alert notifications.

2. The method of claim 1 further comprising:

generating, using the processing device, one or more alarm notifications associated with the condition based on the comparing of the condition with the one or more alert triggering conditions;

transmitting, using the communication device, the one or more alarm notifications to the one or more user devices; and receiving, using the communication device, one or more responses corresponding to the one or more alarm notifications from the one or more user devices, wherein the generating of the one or more alert notifications is further based on the one or more responses.

3. The method of claim 1 further comprising:

receiving, using the communication device, one or more requests from the one or more user devices; and analyzing, using the processing device, the one or more requests, wherein the determining of the condition is further based on the analyzing of the one or more requests.

4. The method of claim 3 further comprises:

determining, using the processing device, an instance of one or more of missing the check-in time for the entering and the check-out time for the exiting by the one or more users and receiving the one or more requests from the one or more users based on the analyzing the one or more requests and the analyzing of the one or more user data and the one or more sensor data;

generating, using the processing device, one or more first alert notifications based on the determining of the instance; and transmitting, using the communication device, the one or more first alert notifications to one or more of the one or more user devices and one or more administrator devices associated with one or more administrators.

5. The method of claim 1 further comprises:

generating, using the processing device, one or more user log entries of the one or more users based on the comparing of the current location at the current time with the one or more expected locations at one or more of the check-in time and the check-out time, wherein the one or more log entries comprise one or more of a location of the one or more users between the check-in time and the check-out time and a time spent by the one or more users at the one or more expected locations; and storing, using the storage device, the one or more log entries of the one or more users in a distributed ledger.

6. The method of claim 1, wherein the one or more user data comprises one or more expected gestures made by the one or more users at one or more of the check-in time and the check-out time, wherein the one or more sensors comprises one or more gesture sensors, wherein the one or more gesture sensors is configured for generating one or more gesture data based on a current gesture made by the one or more users at the current time, wherein the one or more sensor data comprises the one or more gesture data, wherein the analyzing comprises comparing the current gesture at the current time with the one or more expected gestures at one or more of the check-in time and the check-out time, wherein the determining of the condition is further based on the comparing of the current gesture at the current time with the one or more expected gestures at one or more of the check-in time and the check-out time.

7. The method of claim 1 further comprising:

retrieving, using the storage device, one or more historical behavior data associated with a behavior of the one or more users at one or more of the check-in time and the check-out time;

analyzing, using the processing device, the one or more historical behavior data using one or more machine learning models;

determining, using the processing device, a behavioral pattern of the one or more users based on the analyzing of the one or more historical behavior data; and determining, using the processing device, the one or more alert triggering conditions based on the determining of the behavioral pattern of the one or more users, wherein the comparing of the conditions with the one or more alert triggering conditions is further based on the determining of the one or more alert triggering conditions.

8. The method of claim 1, wherein the storing comprises storing one or more of the one or more user data, the one or more sensor data, the condition, and the one or more alert notifications in a distributed ledger.

9. The method of claim 1, wherein the one or more user data comprises one or more expected biological metrics of the one or more users at one or more of the check-in time and the check-out time, wherein the one or more sensors comprises one or more biological sensors, wherein the one or more biological sensors is configured for generating one or more biological metrics based on one or more of a physical parameter and a physiological parameter of a body of the one or more users at the current time, wherein the one or more sensor data comprises the one or more biological metrics, wherein the analyzing comprises comparing the one or more biological metrics at the current time with the one or more expected biological metrics at one or more of the check-in time and the check-out time, wherein the determining of the condition is further based on the comparing of the one or more biological metrics at the current time with the one or more expected biological metrics at one or more of the check-in time and the check-out time.

10. The method of claim 9 further comprising:
identifying, using the processing device, one or more content for alleviating the condition of the one or more users based on the determining of the condition; and
transmitting, using the communication device, the one or more content to the one or more user devices.

11. A system for providing protection to users working in a field, the system comprising:
a communication device configured for:
receiving one or more user data associated with one or more users from one or more user devices, wherein the one or more user data comprises one or more of a check-in time for entering and a check-out time for exiting one or more expected locations of the field;
receiving one or more sensor data associated with the one or more users from one or more sensors comprised in the one or more user devices, wherein the one or more sensors comprises one or more location sensors, wherein the one or more location sensors is configured for generating one or more location data based on a current location of the one or more users at a current time, wherein the one or more sensor data comprises the one or more location data; and
transmitting one or more alert notifications to one or more emergency contact devices associated with one or more emergency contacts of the one or more users;
a processing device communicatively coupled with the communication device, wherein the processing device is further configured for:
analyzing the one or more user data and the one or more sensor data, wherein the analyzing comprises comparing the current location at the current time with the one or more expected locations at one or more of the check-in time and the check-out time;
determining a condition of the one or more users based on the analyzing;
comparing the condition with one or more alert triggering conditions based on the determining of the condition; and
generating the one or more alert notifications for the one or more users based on the comparing of the condition with the one or more alert triggering conditions; and
a storage device communicatively coupled with the processing device, wherein the storage device is configured for storing one or more of the one or more user data, the one or more sensor data, the condition, and the one or more alert notifications.

12. The system of claim 11, wherein the processing device is further configured for generating one or more alarm notifications associated with the condition based on the comparing of the condition with the one or more alert triggering conditions, wherein the communication device is further configured for:
transmitting the one or more alarm notifications to the one or more user devices; and
receiving one or more responses corresponding to the one or more alarm notifications from the one or more user devices, wherein the generating of the one or more alert notifications is further based on the one or more responses.

13. The system of claim 11, wherein the communication device is further configured for receiving one or more requests from the one or more user devices, wherein the processing device is further configured for analyzing the one or more requests, wherein the determining of the condition is further based on the analyzing of the one or more requests.

14. The system of claim 13, wherein the processing device is further configured for:
determining an instance of one or more of missing the check-in time for the entering and the check-out time for the exiting by the one or more users and receiving the one or more requests from the one or more users based on the analyzing the one or more requests and the analyzing of the one or more user data and the one or more sensor data; and
generating one or more first alert notifications based on the determining of the instance, wherein the communication device is further configured for transmitting the one or more first alert notifications to one or more of the one or more user devices and one or more administrator devices associated with one or more administrators.

15. The system of claim 11, wherein the processing device is further configured for generating one or more user log entries of the one or more users based on the comparing of the current location at the current time with the one or more expected locations at one or more of the check-in time and the check-out time, wherein the one or more log entries comprise one or more of a location of the one or more users between the check-in time and the check-out time and a time spent by the one or more users at the one or more expected locations, wherein the storage device is further configured for storing the one or more log entries of the one or more users in a distributed ledger.

16. The system of claim 11, wherein the one or more user data comprises one or more expected gestures made by the one or more users at one or more of the check-in time and the check-out time, wherein the one or more sensors comprises one or more gesture sensors, wherein the one or more gesture sensors is configured for generating one or more gesture data based on a current gesture made by the one or more users at the current time, wherein the one or more sensor data comprises the one or more gesture data, wherein the analyzing comprises comparing the current gesture at the current time with the one or more expected gestures at one or more of the check-in time and the check-out time, wherein the determining of the condition is further based on the comparing of the current gesture at the current time with the one or more expected gestures at one or more of the check-in time and the check-out time.

17. The system of claim 11, wherein the storage device is further configured for retrieving one or more historical behavior data associated with a behavior of the one or more users at one or more of the check-in time and the check-out time, wherein the processing device is further configured for:
analyzing the one or more historical behavior data using one or more machine learning models;
determining a behavioral pattern of the one or more users based on the analyzing of the one or more historical behavior data; and
determining the one or more alert triggering conditions based on the determining of the behavioral pattern of the one or more users, wherein the comparing of the conditions with the one or more alert triggering conditions is further based on the determining of the one or more alert triggering conditions.

18. The system of claim 11, wherein the storing comprises storing one or more of the one or more user data, the one or more sensor data, the condition, and the one or more alert notifications in a distributed ledger.

19. The system of claim 11, wherein the one or more user data comprises one or more expected biological metrics of the one or more users at one or more of the check-in time and the check-out time, wherein the one or more sensors comprises one or more biological sensors, wherein the one or more biological sensors is configured for generating one or more biological metrics based on one or more of a physical parameter and a physiological parameter of a body of the one or more users at the current time, wherein the one or more sensor data comprises the one or more biological metrics, wherein the analyzing comprises comparing the one or more biological metrics at the current time with the one or more expected biological metrics at one or more of the check-in time and the check-out time, wherein the determining of the condition is further based on the comparing of the one or more biological metrics at the current time with the one or more expected biological metrics at one or more of the check-in time and the check-out time.

20. The system of claim 19, wherein the processing device is further configured for identifying one or more content for alleviating the condition of the one or more users based on the determining of the condition, wherein the communication device is further configured for transmitting the one or more content to the one or more user devices.

* * * * *